(12) United States Patent
Sandelman et al.

(10) Patent No.: US 6,717,513 B1
(45) Date of Patent: *Apr. 6, 2004

(54) ELECTRONIC MESSAGE DELIVERY SYSTEM UTILIZABLE IN THE MONITORING OF REMOTE EQUIPMENT AND METHOD OF SAME

(75) Inventors: David Sandelman, Fairfield, NJ (US); Daniel Shprecher, Highland Lakes, NJ (US); Joseph Rey, Fairlawn, NJ (US)

(73) Assignee: Heat-Timer Corporation, Fairfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/224,243

(22) Filed: Aug. 19, 2002

Related U.S. Application Data

(63) Continuation of application No. 09/578,137, filed on May 24, 2000, now Pat. No. 6,437,691, which is a continuation-in-part of application No. 09/317,235, filed on May 24, 1999, now Pat. No. 6,147,601, and a continuation-in-part of application No. 09/401,460, filed on Sep. 22, 1999, now Pat. No. 6,160,477, and a continuation-in-part of application No. 09/433,767, filed on Nov. 3, 1999, now Pat. No. 6,211,782.

(60) Provisional application No. 60/115,305, filed on Jan. 9, 1999.

(51) Int. Cl.$^7$ .............................................. G08B 29/00
(52) U.S. Cl. ..................... 340/506; 340/511; 340/539.1; 340/3.1; 340/825.36; 340/825.49; 700/17
(58) Field of Search .................................. 340/506, 511, 340/539.1, 3.1, 825.36, 825.49; 700/17

(56) References Cited

U.S. PATENT DOCUMENTS

| | | | | |
|---|---|---|---|---|
| 5,061,916 A | * | 10/1991 | French et al. ............... | 340/522 |
| 5,400,246 A | * | 3/1995 | Wilson et al. ...... | 340/825.06 X |
| 5,517,690 A | * | 5/1996 | Linquist et al. ............. | 455/426 |
| 5,526,401 A | * | 6/1996 | Roach, Jr. et al. .......... | 455/426 |
| 5,528,675 A | * | 6/1996 | Lchen .................... | 379/106.01 |
| 5,546,444 A | * | 8/1996 | Roach, Jr. et al. .......... | 455/412 |
| 5,594,740 A | * | 1/1997 | Ladue ........................ | 455/410 |
| 5,629,687 A | * | 5/1997 | Sutton et al. .......... | 340/825.37 |
| 5,729,596 A | * | 3/1998 | Reeder et al. ......... | 379/102.04 |
| 5,734,645 A | * | 3/1998 | Raith et al. .................. | 370/329 |
| 5,748,104 A | * | 5/1998 | Argyoudis et al. ..... | 340/870.11 |
| 5,794,210 A | * | 8/1998 | Goldhaber et al. ........... | 705/14 |
| 5,855,008 A | * | 12/1998 | Gholdhaber et al. .......... | 705/14 |
| 5,917,405 A | | 6/1999 | Joao | |
| 6,147,601 A | * | 11/2000 | Sandelman et al. ......... | 340/506 |

* cited by examiner

*Primary Examiner*—Daryl Pope
(74) *Attorney, Agent, or Firm*—Levisohn, Berger & Langsam, LLP

(57) ABSTRACT

A system and method for monitoring remote equipment such as HVAC equipment, are provided. A sensor is in communication with a piece of remote equipment. An interface unit, having a message generating mechanism, is capable of receiving signals from the sensors. A central computer server is in communication with the interface unit and is adapted to receive and preferably store messages generated by the interface unit from a variety of different data transports. When a sensor detects an exception condition in a piece of remote equipment, the sensor transmits a signal to the interface unit, and the interface unit generates an incoming exception message and forwards the message to the server. The server forwards at least one outgoing exception message to at least one predetermined user-defined communication device based on the incoming exception message. Multiple outgoing exception messages may be forwarded to multiple communication devices in accordance with a user-defined message profile, or a single outgoing exception message may be forwarded in response to receipt of multiple incoming exception messages. The message profile is remotely configurable by the user.

21 Claims, 19 Drawing Sheets

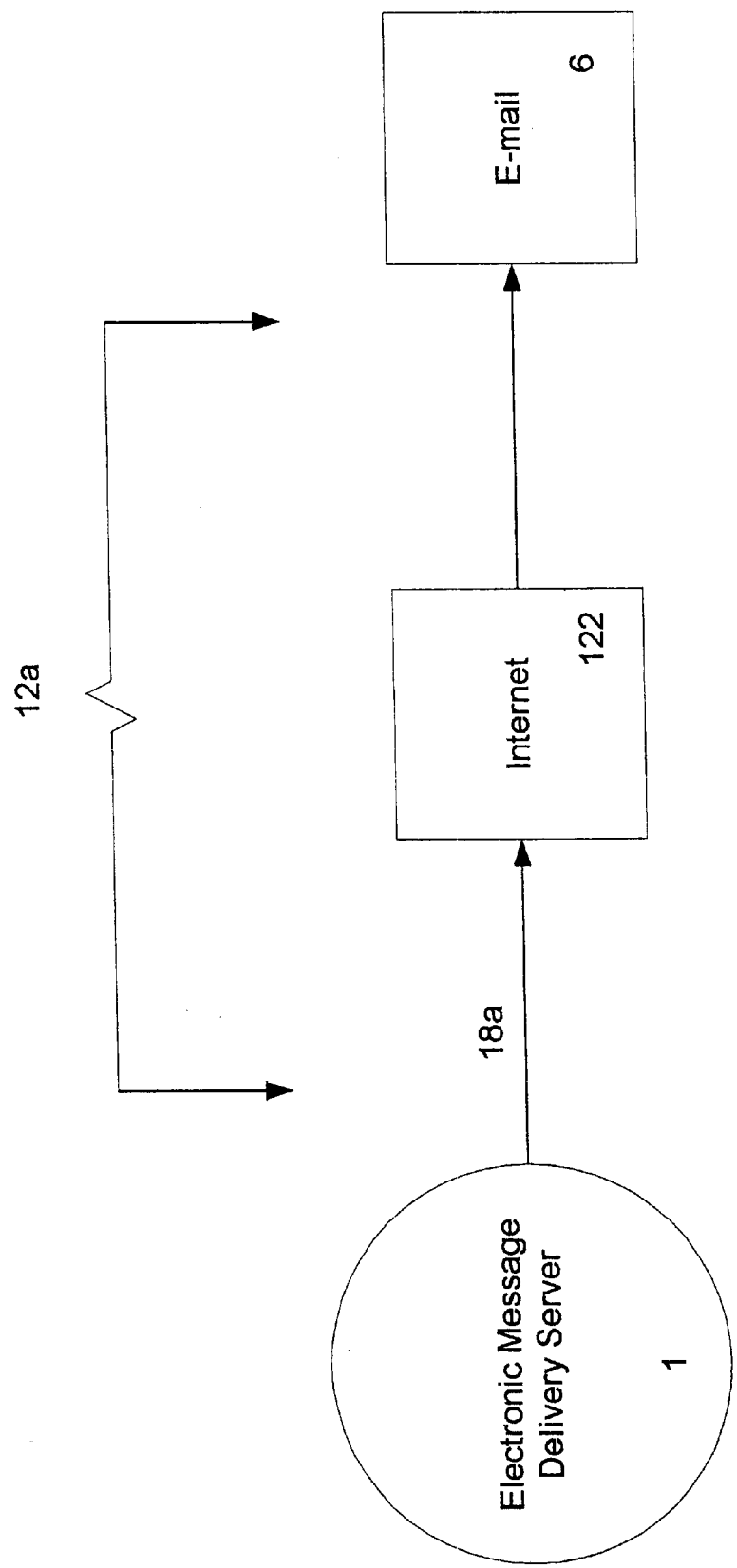

| Incoming Message Table Transport A | | | | 705 |
|---|---|---|---|---|
| Key | Element A | Int | nnnn | |
| | Data | Int | NNN..N | |
| | Element B | Int | nnnn | |
| | Element C | Char | $ | |
| | Element D | Char | $$$..$ | |
| | Element E | Char | $$$..$ | |
| | Element F | Int | nnnn | |
| | Element G | Int | nnnn | |
| | Element H | Char | $$$..$ | |
| | Element I | Int | nnnn | |

| Incoming Message Table Transport B | | | | 706 |
|---|---|---|---|---|
| Key | Element A | Char | $ | |
| | Element B | Char | $ | |
| | Data | Int | HHH..H | |
| | Element C | Char | $ | |
| | Element D | Char | $$$..$ | |

Figure 9

| Device Message Delivery | | | | |
|---|---|---|---|---|
| Key | Message Delivery Id | Int | nnnn | 720A |
| | Message Id | Int | nnnn | |
| | Device Id | Int | nnnn | |
| | In Service | Char | $ | |
| | Delivery Attempts | Int | nnnn | |
| | Delivery Method | Char | $$$..$ | |
| | Retry Interval | Int | nnnn | |
| | Wait Time | Int | nnnn | |
| | Start Time | Datetime | DD | |
| | End Time | Datetime | DD | |

| Device Location | | | | |
|---|---|---|---|---|
| Key | Device Location Id | Int | nnnn | 721A |
| | Notifact User Id | Int | nnnn | |
| | Device Id | Int | nnnn | |
| | Installation Date | Datetime | TT:TT | |
| | Retirement Date | Datetime | TT:TT | |
| | Device Location Name | Char | $$$..$ | |
| | Gmt Offset | Int | nnnn | |
| | Daylight Savings Time | Char | $$$..$ | |
| | Salutation | Char | $$$..$ | |
| | First Name | Char | $$$..$ | |
| | Middle Initial | Char | $$$..$ | |
| | Last Name | Char | $$$..$ | |
| | Gender | Char | $$$..$ | |
| | Phone | Char | $$$..$ | |
| | Extension | Char | $$$..$ | |
| | Address 1 | Char | $$$..$ | |
| | Address 2 | Char | $$$..$ | |
| | City | Char | $$$..$ | |
| | State | Char | $$$..$ | |
| | Zip | Char | $$$..$ | |
| | Manufacturer | Char | $$$..$ | |
| | Model | Char | $$$..$ | |
| | Serial Number | Char | $$$..$ | |
| | Name | Char | $$$..$ | |

Figure 12

| Fax Delivery | | | | |
|---|---|---|---|---|
| Key | Message Delivery Id | Int | nnnn | 722A |
| | Fax Number | Char | $$$..$ | |
| | To Name | Char | $$$..$ | |
| | From Name | Char | $$$..$ | |
| | Message Text | Char | $$$..$ | |
| | Subject | Char | $$$..$ | |

| Modem Delivery | | | | |
|---|---|---|---|---|
| Key | Message Delivery Id | Int | nnnn | 723A |
| | Modem Address | Char | $$$..$ | |
| | Message Text | Char | $$$..$ | |
| | Subject | Char | $$$..$ | |

| Pager Delivery | | | | |
|---|---|---|---|---|
| Key | Message Delivery Id | Int | nnnn | 724A |
| | Phone Number | Char | $$$..$ | |
| | Dialed Digits | Char | $$$..$ | |
| | Message Text | Char | $$$..$ | |

| Phone Delivery | | | | |
|---|---|---|---|---|
| Key | Message Delivery Id | Int | nnnn | 725A |
| | Phone Number | Char | $$$..$ | |
| | Voice Message File | Char | $$$..$ | |
| | Message Text | Char | $$$..$ | |

Figure 13

| Delivery Attempt | | | | |
|---|---|---|---|---|
| Key | Delivery Attempt Id | Int | nnnn | 726A |
| | Message Delivery Id | Int | nnnn | |
| | Device Message Id | Int | nnnn | |
| | Attempt Result | Char | $$$..$ | |
| | Delivery Attempt Dt | Datetime | TT:TT | |
| | Attempt Number | Int | nnnn | |
| | Wait Time | Int | nnnn | |
| | Binary File | Char | $$$..$ | |
| | Attempt Finish | Datetime | TT:TT | |
| | Result Text | Char | $$$..$ | |

| Device Heartbeat | | | | |
|---|---|---|---|---|
| Key | Device Hb Id | Int | nnnn | 727A |
| | Hb Transport | Char | $$$..$ | |
| | Hb Data | Char | $$$..$ | |
| | Device Id | Int | nnnn | |
| | Device Location Id | Int | nnnn | |
| | Hb Date | Datetime | TT:TT | |

| Device Message | | | | |
|---|---|---|---|---|
| Key | Device Message Id | Int | nnnn | 728 |
| | Message Id | Int | nnnn | |
| | Device Id | Int | nnnn | |
| | Device Message DT | Datetime | TT:TT | |
| | Device Location Id | Int | nnnn | |

| Normalized Message | | | | |
|---|---|---|---|---|
| | Message Delivery Id | Int | nnnn | 710A |
| Key | Message Queue Id | Int | nnnn | |
| | Status | Char | $ | |
| | Device Message Id | Int | nnnn | |
| | Next Attempt | Datetime | TT:TT | |

Figure 14

ELECTRONIC MESSAGE DELIVERY SYSTEM UTILIZABLE IN THE MONITORING OF REMOTE EQUIPMENT AND METHOD OF SAME

RELATED APPLICATIONS

This is a Continuation Application of U.S. patent application Ser. No. 09/578,137, filed May 24, 2000, now U.S. Pat. No. 6,437,691 which is a Continuation-in-Part application of the following three applications: (i) U.S. patent application Ser. No. 09/317,235, filed May 24, 1999 (now U.S. Pat. No. 6,147,601); (ii) U.S. patent application Ser. No. 09/401,460, filed Sep. 22, 1999 (now U.S. Pat. No. 6,160,477); and (iii) U.S. patent application Ser. No. 09/433,767, filed Nov. 3, 1999 (now U.S. Pat. No. 6,211,782). All three applications claimed domestic priority from U.S. Provisional Patent Application No. 60/115,305, filed Jan. 9, 1999.

BACKGROUND OF THE INVENTION

1. Field of the Invention

The invention relates to monitoring systems, and more specifically to networks for remotely monitoring the condition of devices such as those employed in heating, ventilating, and cooling (HVAC) systems.

2. Description of the Related Art

It is desirable to be able to monitor remotely equipment that may require periodic preventive maintenance and/or that may require rapid response time should a catastrophic failure occur. For example, the components of a building's HVAC system must be monitored or checked frequently. Preventive maintenance must be performed on a constant basis, particularly with larger systems. Fault or failure conditions may vary in degrees of severity, however the contractor responsible for maintaining the HVAC equipment should be made aware of each failure in due course. Since a contractor, in all likelihood, is responsible for the care and maintenance of the installations of multiple clients, and since fault conditions may occur at any time of day or night, it is not practical for a contractor to remain on-site all the time. Remote detection at a central location (for example, the contractor's office) of fault conditions is desirable and often crucial.

It is further desirable to be able to activate or deactivate a piece of equipment remotely or send it commands remotely. It is also desirable to know the approximate failure rate or frequency of failure of each piece of equipment. One can make installation recommendations as to which model or brand of equipment is best suited for a particular site, and one can anticipate the failure of an already-installed piece of equipment and specific components therein based on how long it is running.

Some remote monitoring devices have been developed. U.S. Pat. No. 5,629,687 to Sutton et al. describes a universal interface for remotely-monitored security or alarm systems. In Sutton et al., a local control unit at a monitored site can, under an event condition, initiate a telephone call to a central control unit to alert a human operator of an event such as an intrusion, fire, or other emergency at the site. The local control unit, via the telephone link, sends a serial number indicative of the specific site and emergency to the monitoring center computer. The monitoring center computer receives the serial number and alerts a human operator as to the emergency. The human operator can then act accordingly, e.g., establish one- or two-way communication with the local site.

U.S. Pat. No. 5,748,104 to Argyroudis et al. describes a wireless remote telemetry system or data transport which provides real-time reading and remote control of devices such as electricity meters. A home base unit communicates with remote metering units via cellular telephone lines. The home base unit also communicates with a central controller operated by the electric utility. When the utility determines that there is too much load on the power grid, for example, the central controller can send messages to an appliance to turn off. A customer could also remotely activate or deactivate an appliance via a cellular phone through the home base unit.

U.S. Pat. No. 5,061,916 to French et al. describes a system for remotely reporting, in graphical format, alarms or other conditions in a building's automation system. Sensors in a building are hooked up via a telephone line to control module which is, in turn, hooked up to a central controller. When a sensor detects a fault condition, graphical information is compiled at the central controller and transmitted to one or more remote facsimile machines.

All of the above systems and the prior art are limited in scope because they do not allow for sufficient flexibility in routing fault messages to a variety of different potential recipients of such messages via a variety of different media, depending on the urgency or nature of the fault. Also, the above systems and the prior art do not enable customers and contractors to enter or modify such information easily. As an example, a customer that has an HVAC system with a monitoring network may want to send certain non-emergency condition notifications (e.g., filter needs cleaning) to certain individuals (e.g., contractor/maintenance personnel) via a certain medium (e.g., e-mail) and emergency condition notifications (e.g., low or high refrigerant pressure) to other individuals (building owner, contractor, etc.) via other means (e.g., via beeper or other personal communication device). Such a list of who to contact via what means depending on which fault has occurred may be referred to as a "message profile". The conventional device/contractor interface requires a dedicated land line at both the HVAC device and the contractor; that is, the HVAC system requires its own phone line, and the contractor must have a dedicated modem line as well. Moreover, the conventional system does not allow for easy customer modifications to the message profile. The conventional systems also do not allow the user to determine the failure rate of the equipment or to determine which pieces of equipment are best suited for a specific site.

SUMMARY OF THE INVENTION

Accordingly, it is an object of the invention to provide a system for remotely monitoring electrical and/or mechanical equipment.

It is another object of the invention to provide a system for remotely monitoring multiple pieces of electrical and/or mechanical equipment in a cost-effective manner.

It is another object of the invention to provide a system for remotely monitoring electrical and/or mechanical equipment that can deliver messages to different individuals for different fault conditions.

It is another object of the invention to provide a system for remotely monitoring electrical and/or mechanical equipment that can deliver fault notification messages to different individuals for different fault conditions via different electronic media.

It is another object of the invention to provide a system for remotely monitoring electrical and/or mechanical equipment that can receive data via different data transports in different formats and normalize the data so that outgoing information is not transport-specific.

It is another object of the invention to provide a system for remotely monitoring electrical and/or mechanical equipment in which a customer may interactively modify its message profile.

It is another object of the invention to provide a system for remotely monitoring electrical and/or mechanical equipment in which a customer may interactively modify its message profile via the Internet.

It is another object of the invention to provide a system for remotely monitoring electrical and/or mechanical equipment in which a user may interactively alter the operation of a piece of equipment remotely.

It is another object of the invention to provide a system for remotely monitoring electrical and/or mechanical equipment in which the functional logic may be modified.

It is another object of the invention to provide a system for remotely monitoring electrical and/or mechanical equipment which can collect data over time concerning the monitored equipment.

The above and other objects are satisfied by the invention which is a remote equipment monitoring system and method for monitoring remote equipment. In the inventive method, a state of at least one parameter of at least one piece of the remote equipment is determined. A message indicative of the state is communicated from the piece of remote equipment to a computer server as an incoming message. A user is able to remotely configure or modify a user-defined message profile containing outgoing message routing instructions; the user-defined message profile is storable on the computer server in a plurality of tables, the routing instructions being of a number of types of information, and there being provided at least one table for each type of routing instruction. It is determined whether an incoming message is an incoming exception message indicative of improper operation of the piece of remote equipment. If it is determined that an incoming message is an incoming exception message, at least one outgoing exception message is forwarded based on the incoming message to at least one user-defined communication device specifiable in the user-defined message profile. The user can remotely configure or modify the user-defined message profile by remotely accessing the computer server.

The inventive system includes a sensor in local communication with a piece of remote equipment; the sensor detects a state of at least one parameter of the piece of remote equipment. An interface unit is locally connected to the sensor and is provided with a message generating mechanism. A computer server is in remote communication with the interface unit, the server being adapted to receive messages generated by the interface unit. The computer server has a user interface; a user can remotely access the computer server via the user interface to remotely configure a user-defined message profile containing outgoing message routing instructions. The computer server is provided with a data base having a plurality of tables; the routing instructions include a number of types of information, each type of the routing instruction being placeable on its own table. When the sensor detects an exception condition in the piece of remote equipment, the interface unit generates an incoming exception message indicative of the exception condition and forwards the message to the server. The server forwards at least one outgoing exception message to at least one predetermined user-defined remote communication device based on the incoming exception message as specified in the user-defined message profile.

The system can contact a customer or contractor via a number of different media (fax, e-mail, pager, etc.) in case of an equipment failure. The contractor can determine which people to contact and which medium to use for which equipment failure. For example, if the condition is not very serious (e.g., filter needs cleaning), the contractor can set up the system to send a message via e-mail; if, however, it is serious (e.g., low/high refrigerant pressure), then the system can page the contractor and/or send a text message over his personal communication service (PCS). Also, the system includes the capability to send multiple messages to multiple recipients via differing media simultaneously for a given exception condition. Preferably, the system includes a centralized electronic message delivery device or server that routes the various incoming exception messages to the desired individuals via the desired electronic media in accordance with the predetermined message profile. More preferably, the contractor or consumer can access the centralized message server via the Internet and modify the message profile through software on the device.

BRIEF DESCRIPTION OF THE DRAWINGS

FIGS. 3a–d are schematics of links between an end-user's machine and the system according to the invention.

FIG. 9 is a schematic of two Incoming Message Tables each respectively receiving information from the two data transports of FIG. 8.

FIG. 12 is a schematic of the Device Message Table, Delivery Table, and Device Location Table which are part of the relational data base of FIG. 4.

FIG. 13 is a schematic of various tables which contain some of the information of the user-defined message profiles of the invention.

FIG. 14 is a schematic of various tables which contain information of outgoing messages of the invention.

DETAILED DESCRIPTION OF THE PREFERRED EMBODIMENTS

Figure 1:
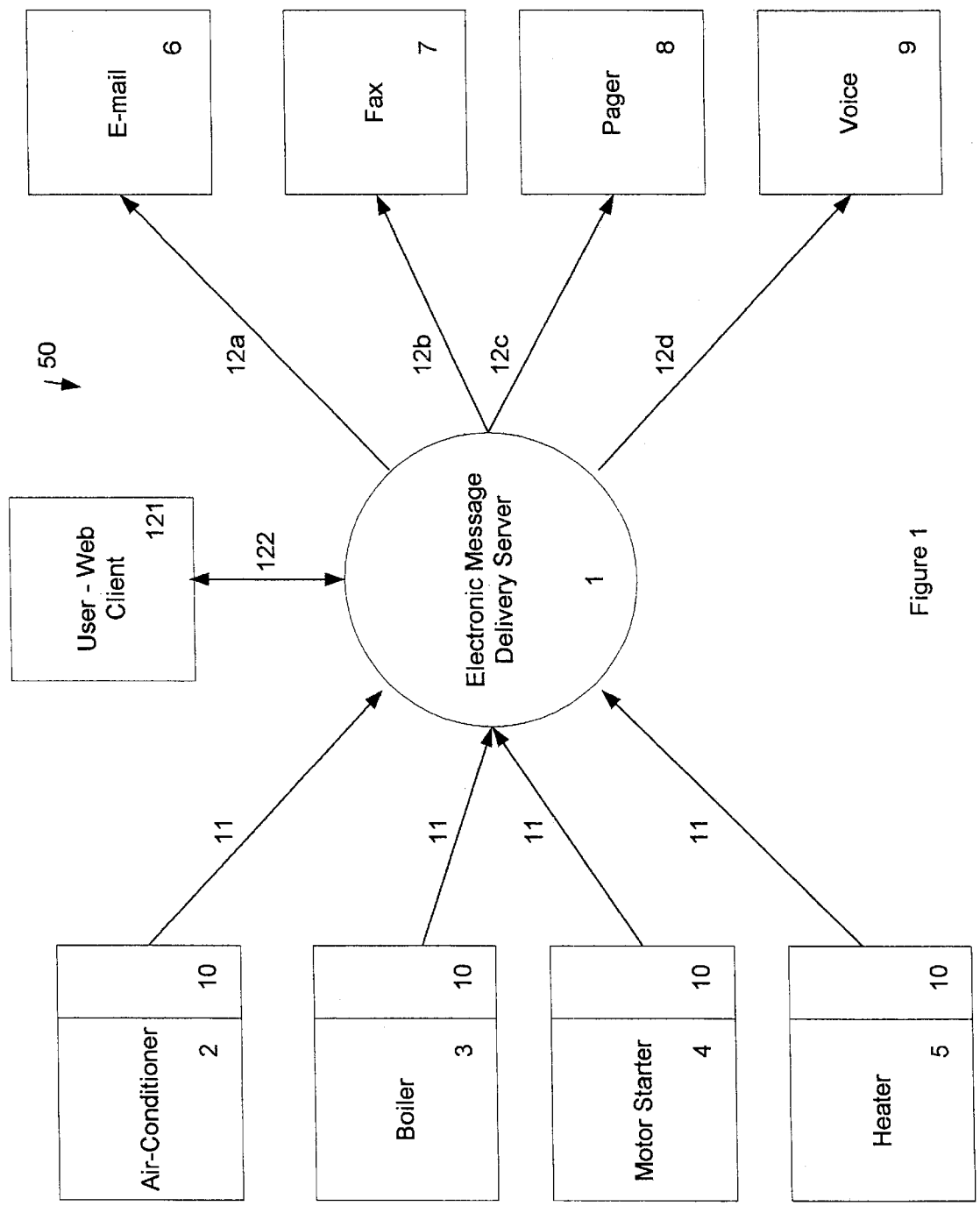
FIG. 1 is a schematic of a preferred embodiment of a system according to the invention.

Equipment that needs to be monitored frequently, such as HVAC equipment, preferably operates within certain acceptable parameters. Some of these parameters are more crucial to the operation and/or life span of the equipment than are other parameters. For example, a low battery condition might be a lot less serious than a low coolant level condition. Whenever a piece of equipment operates outside its preferred parameters, an "exception" condition is created or said to exist. An exception condition can also be indicative of a regularly scheduled event occurring too often, too infrequently, or not at all. An exception condition could also be indicative of a measured value being beyond the design specification for the equipment.

When a monitored piece of equipment detects an exception condition, it activates its interface to the cellular phone network. The interface effectively acts as a cell phone in a roaming condition. The interface "attempts" to make a telephone call; because it is not recognized as being a resident of the local cell, the local cell (via the cellular network or mobile switching center) contacts the "home cell" of the interface to insure that the interface is in good standing to complete the "call." There really is no home cell; in actuality, what is taking the place of the home cell of a cellular telephone is a message routing service or data transport such as those provided by Aeris or Bell South Cellemetry. When the local cell is contacting the message routing service, it transmits the following information: the serial number of the interface; the multi-digit "phone number" assigned to the interface; and the multi-digit phone number that the interface is "attempting to call." The message routing service tells the local cell that the interface is okay and should not be blacklisted, that the call need not go through, and that the interface should be removed from the "okay to roam" list immediately.

The interface is not really trying to call anyone; the multi-digit phone number it was trying to call represents a multi-digit code of information that is being sent to the message routing service and may represent fault information (e.g., 212-555-1212 means "filter needs cleaning"). The phone number assigned to the interface (which is also sent along with the phone number it is "trying to contact") may not only indicates which unit is doing the transmitting but may also convey fault information, since many of the devices being monitored do not have a large number of different fault conditions. This type of technology, in which information is transmitted in the handshaking portion of a cellular transmitter communicating to a local cell, appears in U.S. Pat. No. 5,594,740 to LaDue and U.S. Pat. No. 5,546,444 to Roach, Jr. et al., and is commonly referred to as using control channel data. In LaDue (the Aeris version), the exception or status information is embedded in the digits of the "phone number" the interface is allegedly calling (the "dialed digits"); in Roach, Jr. (the Bell South Cellemetry version), the exception or status information is embedded in the electronic serial number (ESN) of the interface, a number which identifies the physical hardware of the device. The information which identifies which interface has sent a message may be embedded in the mobile identification number (MIN) assigned to the interface unit. In the Aeris system, the ESN may also contain interface identification information. The structure of the quanta or packets of information transmitted by typical data transports will be discussed in greater detail below.

The present invention expands on this technology and includes the message delivery technique mentioned above. The Aeris or Bell South Cellemetry router transmits the exception data to the inventive message delivery system which forwards the information to the contractor who is responsible for maintaining the faulty equipment. The contractor is provided with an account on the message delivery system that he can access via the Internet. The contractor sets up the specific parameters of which exception conditions are reported to which individuals. The contractor also sets up by which media (fax, e-mail, PCS) these individuals are to be notified. Multiple individuals may be alerted as to a exception condition. All of this data constitutes the contractor's message profile. For example, both the contractor and the owner of the premises might be signaled if there is a low/high refrigerant condition, however perhaps only one of them would be notified if a filter required cleaning. The user may also set, as part of the message profile, that different messages be delivered to different individuals at different times of the day, week, month, season, or year. For example, a high priority exception message may be directed to one repair/maintenance entity during regular business hours but be directed to a different repair/maintenance entity at night. Similarly, the same person could be contacted by different means (e.g., fax or PCS) at different times. The content of the messages may also vary as a function of time. In the present invention, the various aspects of a user's message profile are stored in a plurality of look-up tables on a data base, as will be explained below.

In addition to notifying contractors when a problem arises, the interface may be programmed to check in once a day with an "all systems okay" message. This "okay" message also gets routed to the message delivery system. However, instead of being handled by,an exception message subroutine in the message delivery system—the portion of the system which handles the above-mentioned fault messages—, the "okay" message is checked by a missing message subroutine. The missing message subroutine checks the entire list of HVAC interfaces that are supposed to signal "okay" from the message delivery system database. The missing message subroutine compares the entire list to the list of HVAC interfaces that actually checked in as "okay". If an interface failed to check in "okay", the message delivery system sends out the appropriate messages to the proper individuals via the selected media, all in accordance with the user's message profile lodged in the user's account with the message delivery system. The periodic "okay" or status message is not merely limited to providing a status "heartbeat" for the equipment but may also be employed to transmit information about the monitored piece of equipment. As will be explained below, the status message only requires a portion of its digits to convey equipment identification information, thus allowing other information to be transmitted as well. For example, the status message may include statistical information about the equipment such as how many cycles it has performed since the last message, the run time of the motor, etc. The status message may also serve as a reminder for routine maintenance, or it may report very minor or low-priority conditions that are not time sensitive.

The format of the message sent from the failing device to the local cell to the router to the message delivery system is a multi-digit code. The first digit can be for message format (e.g., status message, exception message, etc.). The sub-address is a digit or two reserved to identify to which unit that a transceiver interface is assigned is experiencing an exception condition; i.e., one transceiver interface may be assigned to a building having nine HVAC units, all connected to the transceiver via a bus line, or one interface may be part of a local RF network where each of multiple HVAC units has its own transmitter. The final digits would indicate tie specific exception condition.

Because different sites employ different data transports, incoming messages from different locations may have different structures or formats. Also, one would want the inventive system to be able to accommodate additional formats of transports as they are developed without having to rebuild the server every time. It is thus desirable to convert all of the incoming messages into a single normalized format for ease of subsequent manipulation. The multi-digit message received by the message delivery system is normalized, converted into a regular text message, and forwarded to the user/contractor. Information can also include model, brand, installation date, and climate and weather data for the site. Alternatively, much of this type of equipment criteria can be stored at the central data base so that only the equipment identification information need be transmitted.

A number of pieces of equipment may be linked to a single cellular interface via a local RF network. This is advantageous because many buildings have multiple pieces of HVAC equipment, and the provision of each piece with its own cellular interface is expensive. The deployment of a local RF network is also advantageous when the multiple HVAC units are fairly remote and a hardwired connection to a common bus line would be impractical or impossible.

Description will now be given of the preferred embodiments with reference to FIGS. 1–15. FIG. 1 shows an overall view of the inventive system 50. An existing piece of equipment may be monitored, for example; an air-conditioner 2, boiler 3, motor starter 4, heater 5, or any other piece of equipment they may be desired to be monitored. The existing piece of equipment is fitted with an interface unit 10. Periodically, the interface unit 10 sends to the message delivery server 1 a status signal to let the message delivery server 1 know that the equipment being monitored and the interface unit 10 are functioning correctly. When a predetermined exception condition occurs in the piece of equipment being monitored, the interface unit 10 sends an incoming exception message to the message delivery server 1. The message delivery server 1 then routes the message as an outgoing exception message to the appropriate user interface; e-mail 6, fax 7, pager 8, voice 9, etc., according to the message profile as configured by the user of the system 21 via the Internet 122.

The inventive system can be deployed on existing pieces of remote equipment. Various sensors can be added to an air conditioner, a boiler, etc. that can detect various conditions. For example, in an air conditioner, different sensors can be provided throughout the system each to detect a different condition such as low or high pressure, a condensate spill, air flow, fan motion, compressor function, etc. Any and all conventional sensors are contemplated as being usable in the invention, including but not limited to pressure sensors, pitot tubes, motion sensors, photosensors, electrical resistance sensors, moisture sensors, magnetic sensors, and the like.

Whether the sensors are built into the HVAC unit or added later, the various sensors in a monitored piece of equipment are preferably arranged in ladder logic configurations in programmable logic controllers (PLCs). Each sensor is responsible for detecting a certain condition or monitoring a certain parameter. These sensors can be grouped via Boolean logic operators (AND, OR, XOR, NOT, etc.) to provide the circumstances under which an exception condition is defined.

Figure 7:
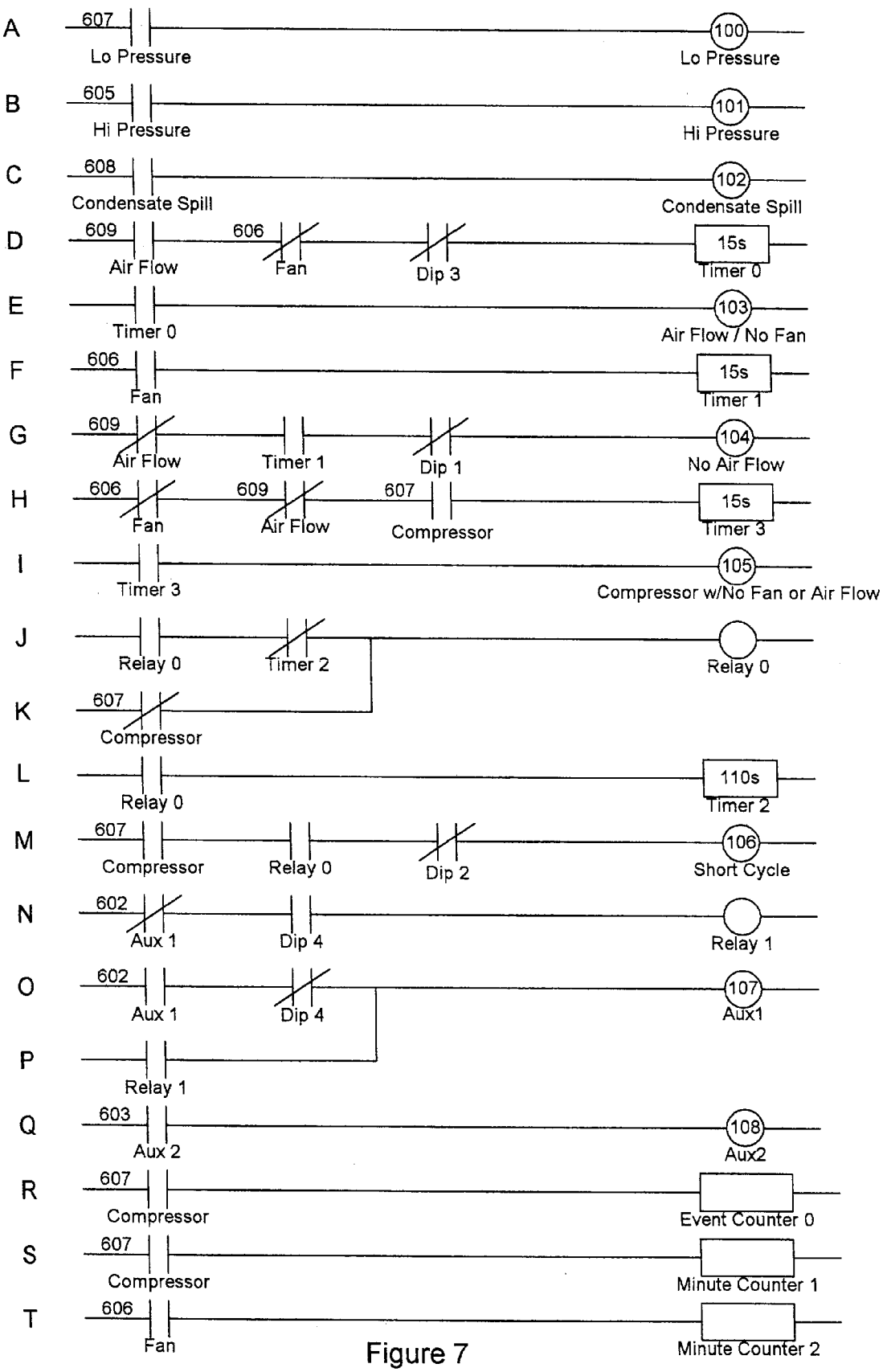
FIG. 7 is a ladder logic diagram in accordance with the invention for an exemplary air conditioning unit.

An example of such a ladder logic PLC for a typical air conditioning unit is shown in FIG. 7. Each of sensors 602–609 monitors a different condition/parameter of the unit. Sensor 604 detects low pressure in the coolant, sensor 605 detects high pressure in the coolant, sensor 606 detects if the fan is working, sensor 607 detects if the compressor is working, sensor 608 determines if a condensate spill has occurred, and sensor 609 detects if the compressor is working. Some of the logic is direct and simple. For example, if sensor 605 detects a high pressure condition, high pressure message 101 is sent via the message generating mechanism of interface unit 10. Similarly, if sensor 608 detects a condensate spill, message 102 is sent.

Other rungs of the ladder are more complex. For example, in line F, if sensor 606 detects that the fan is working, timer 1 is activated; if no air flow is detected by sensor 609 before timer 1 times out, the "no air flow" message 104 is sent. If, in line H, sensor 606 detects no fan operation and sensor 609 detects no air flow but sensor 607 detects proper compressor function, and timer 3 times out, "compressor w/no fan or air flow" message 105 is sent (line 1). As another example, message 107 is sent out if sensor 602 detects a logic 0 in "aux 1" input and dip switch 4 is closed (logic 1) by activating relay 1 in line P. Alternatively, if sensor 602 detects a logic 1 in "aux 1" and dip switch 4 is open (logic 0), a message will be sent. In either case, a message 107 is sent in line O.

The dip switches are provided to allow certain portions of the logic to be disabled if a customer is not interested in receiving a certain type of message. For example, a sensor could be set to detect if a compressor is cycling fast and to send a "fast cycle" message in that event. However, if the user has the compressor deliberately set up to cycle fast, the user will not want to receive a constant stream of messages informing him that the compressor is cycling fast. Instead, a dip switch can be set to disable that message from being sent. The conventional dip switch is adjustable on-site. The invention contemplates also enabling the user to set up virtual dip switches via the Internet at a central server as will be explained below.

Each PLC can be different for each unit, type of unit, brand, model, etc. The PLC may be hard wired at the remote installation site in the interface unit 10, or software in the interface unit may simulate the workings of a PLC as a "virtual PLC.". Alternatively, the various sensors can be linked via computer software at a web site that interacts with system 21, or a virtual PLC may be provided on server 1. For example, instead of sending out a low pressure message 100 for a low pressure condition and a high pressure message 101 for a high pressure condition, a user can OR the outputs of sensors 604 and 605 together for the sending out of an "abnormal pressure" message. A user can adjust a logic ladder in the same or similar fashion as one would edit a message profile, e.g., by menu-driven websites, by an automated telephone response system, etc. The user can, of course, request an initial hardwired configuration of the system installer and have that adjusted on-site as needed.

Figure 6:
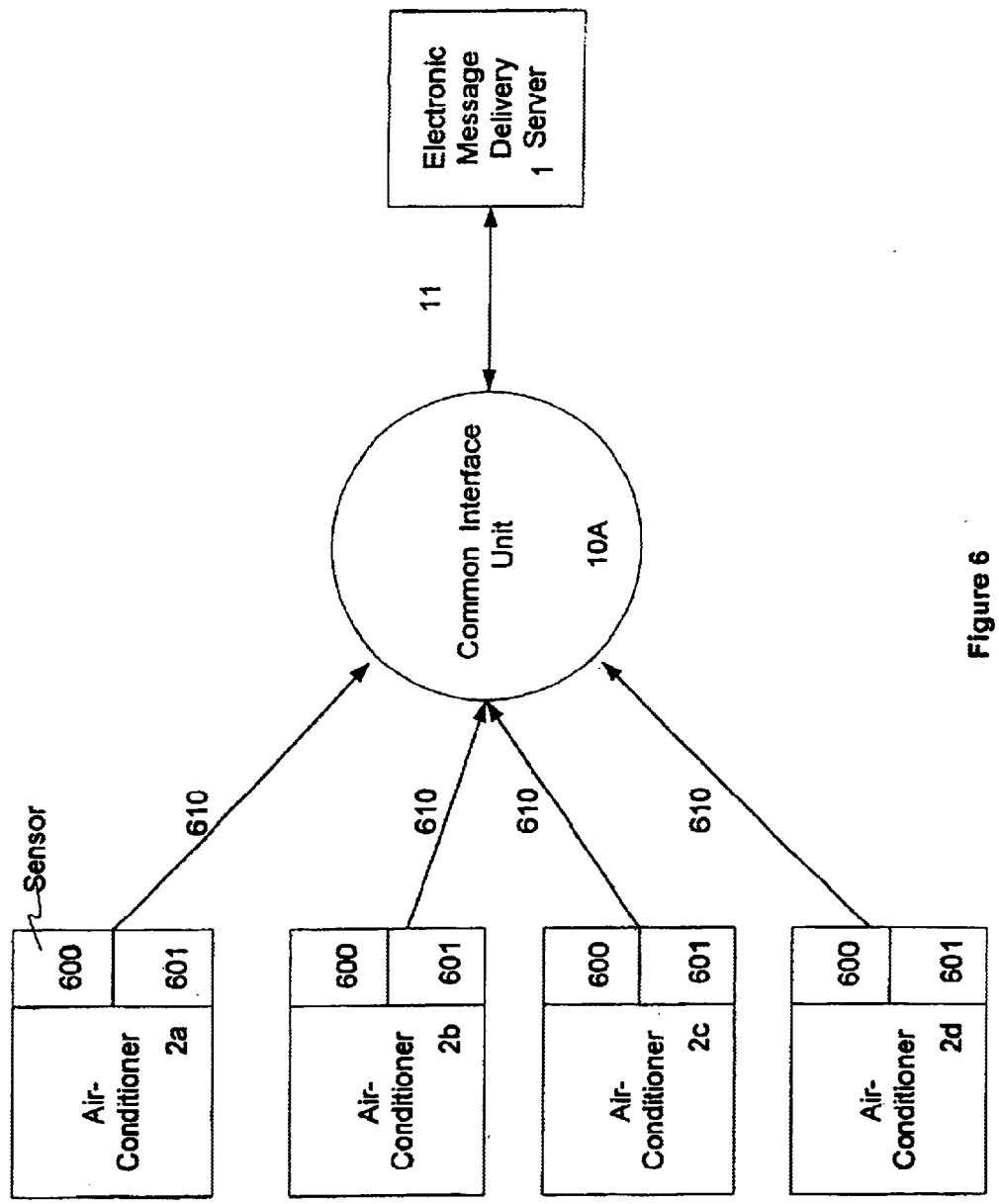
FIG. 6 is a schematic of a local RF network linking several pieces of equipment together in accordance with an alternative embodiment of the invention.

In FIG. 1, each piece of equipment 1–4 is provided with its own interface unit 10. An alternative configuration is shown in FIG. 6. As shown in FIG. 6, four air conditioners 2A–D are each provided with sensor 600 (which generically represents any of sensors 602–609 and any like sensors) and an RF transmitter 601. When an exception condition is detected by sensor 600, or if after a certain period of time, no exception condition is detected, transmitter 601 transmits an RF signal 610 to a common interface unit 10'. Common interface unit 10' includes antenna A for receiving signals 610. Unit 10' sends incoming messages to the electronic message delivery server 1 via link 11 in the same manner as shown in FIG. 1.

Figure 2:
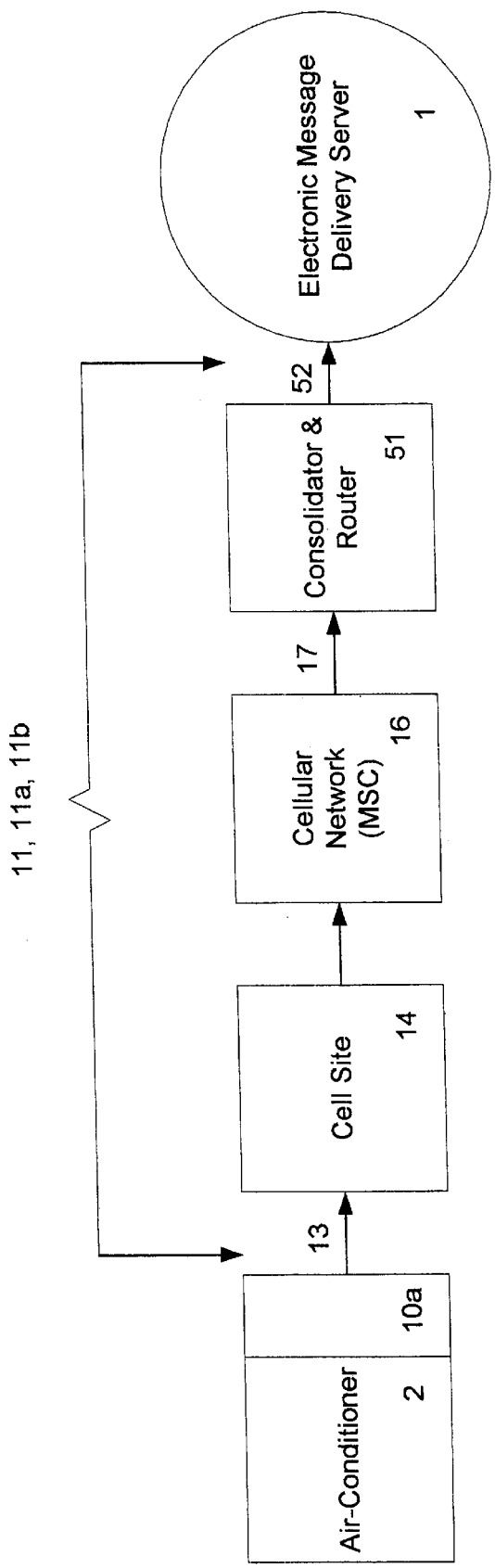
FIG. 2 is a schematic of a preferred embodiment of a link between the monitored equipment and the system according to the invention.

Messages from some of the interface units 10 may be delivered by means of wireless transmission over the cellular telephone network (see U.S. Pat. Nos. 5,594,740 and 5,546,444). FIG. 2 is a detailed view of link 11 shown in FIG. 1. A message is transmitted from the cellular interface unit 10a via a radio frequency link 13 to a nearby cellular transceiver site 14, the message is then routed to the cellular network or mobile switching center (MSC, e.g., a cellular carrier such as Bell Atlantic) 16 where the message is then delivered via data circuits 17 and via router 51 (e.g., Bell South Cellemetry or Aeris) to the message delivery server 1. As will be clear from the discussion of FIG. 4, reference numerals 11a and 11b refer to different types of links. Specifically, link 11a is for receiving incoming exception and status messages from interfaces 10 which are in regions wired for sending data via the dialed digits control channel; link 11b forwards messages along the ESN channel to the message server 1.

Figure 3B:
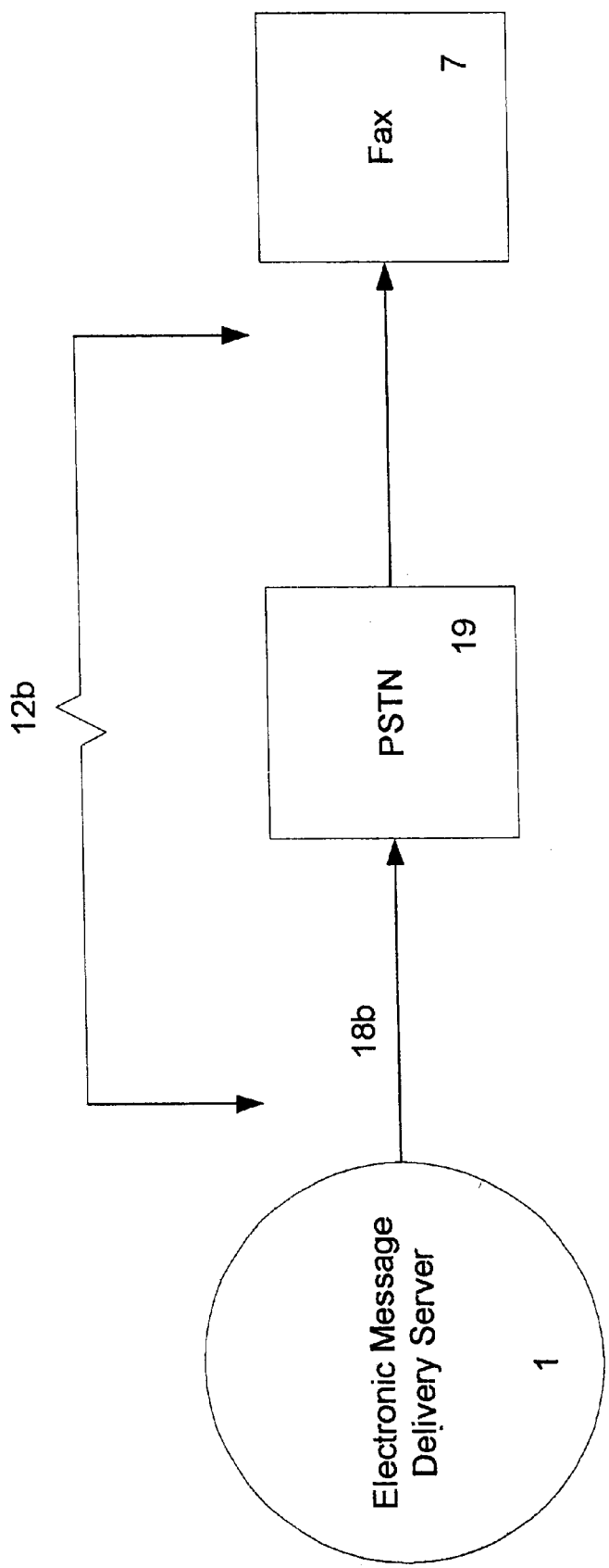
Figure 3C:
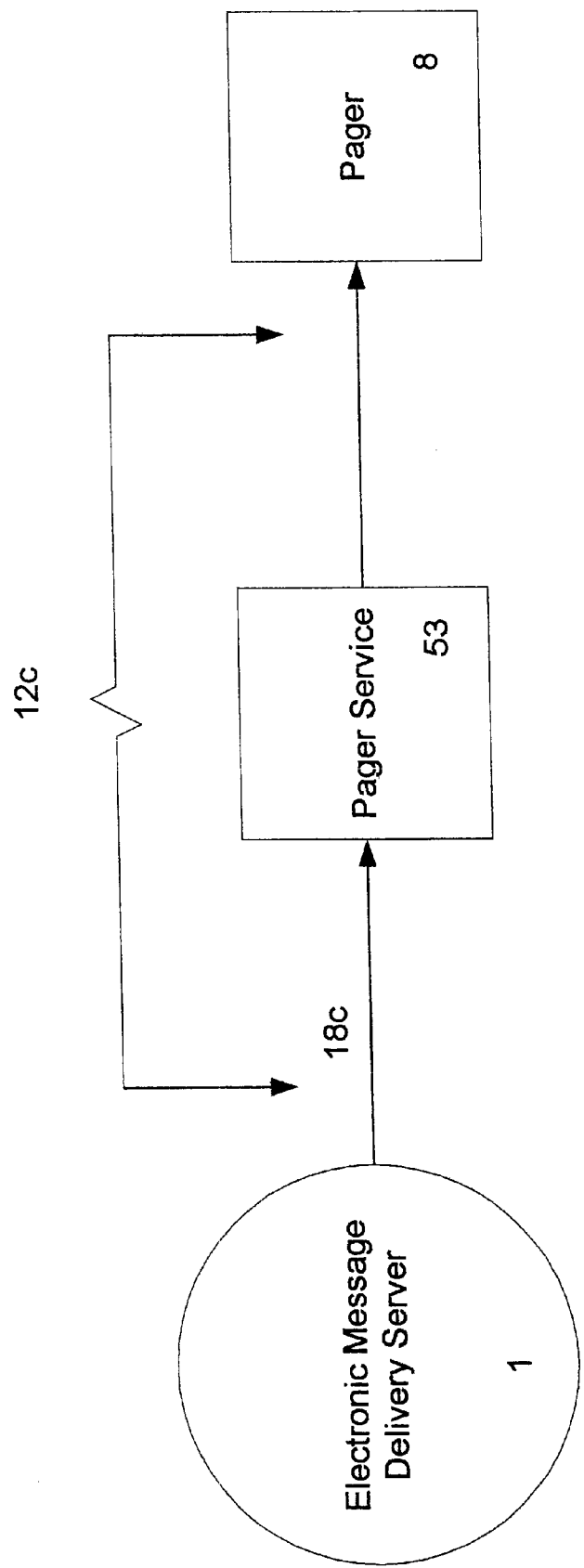
Figure 3D:
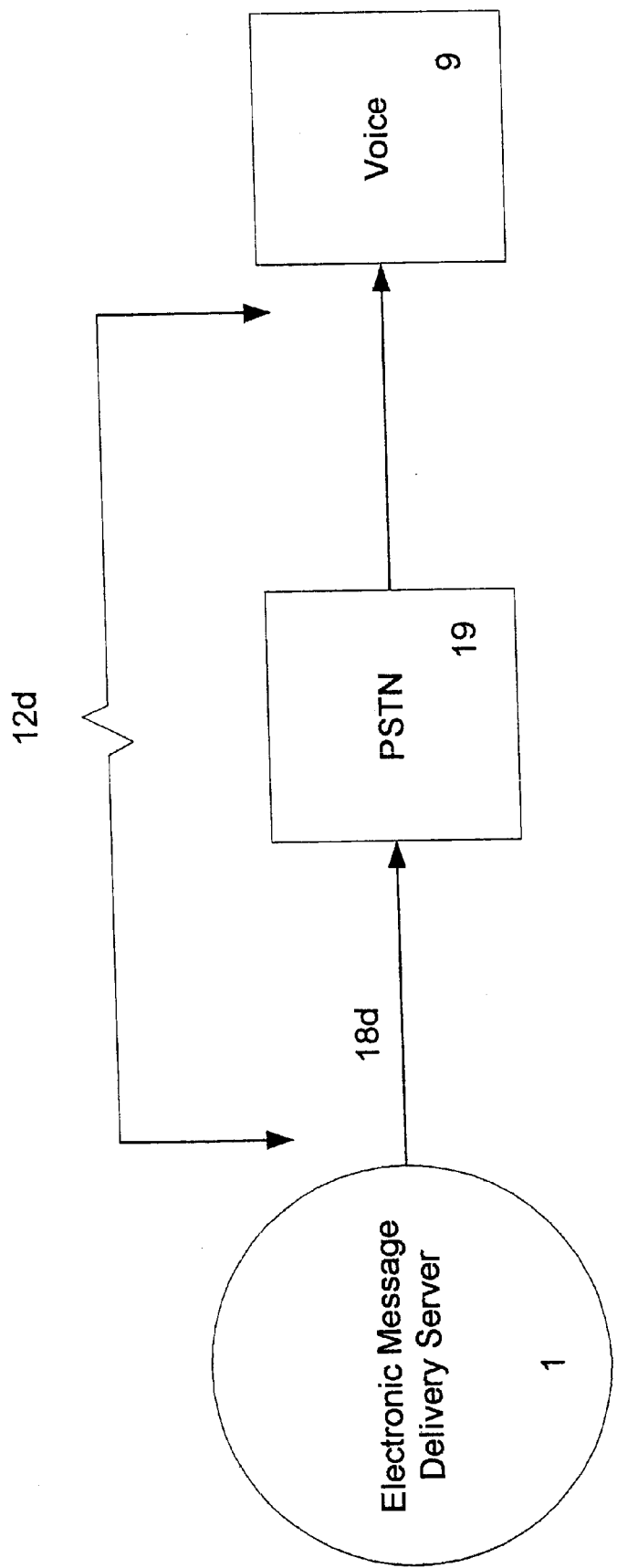

Based on the configuration of the user's message profile, the outgoing exception message (or messages) is then delivered to the specified end device or devices. FIGS. 3a–d show a more detailed view of the various outbound links 12a–d that connect the server 1 to the various electronic media. In FIG. 3a, server 1 sends the message over a telephone line 18a to the Internet 122 and deposits the message in the user's e-mail box 6. In FIG. 3b, server 1 sends the message over a telephone line 18b through the public telephone switched network (PTSN) 19 to the user's fax machine 7. In FIG. 3c, server 1 sends the message over a telephone line 18c to the user's pager service 53 and thence to the user's pager or PCS 8. In FIG. 3d, server 1 sends the message over a telephone line 18d through the PTSN 19 to the user's voice mail box 9. The same message may also be sent to a number of other devices as configured by the user 121 over the Internet 122. The same message that is being sent to a fax machine 7 as described above may also simultaneously be sent to an e-mail 6 recipient via the Internet. Preferably, different messages can be sent to different individuals simultaneously for the same fault condition; for example, the owner of the premises may receive a less-detailed message than the contractor.

A user's message profile can also be configured to store messages on server 1 for delivery at a later time or after certain conditions are met. For example, a contractor may not want his beeper activated every time server 1 receives an incoming exception message. The user profile can be configured to deliver messages on groups or only after several messages have accumulated for the same user/contractor. Optionally, an outgoing exception message may be generated only after several of the same type of incoming message are received; a portion of the memory of server 1 may be devoted to the storing and/or accumulating of messages. Alternatively, a single outgoing exception message may be generated in response to several incoming messages.

In the same way the user profile can be configured, the user can configure virtual dip switches to enable or disable certain error messages. Conventional hardwired dip switches must be adjusted on site at the remote equipment. Virtual dip switches are software subroutines stored in server 1 which allow the user to toggle on or off certain portions of the ladder logic of the PLCs controlling the sensors of the remote equipment. According to the invention, the user can go to a website on the Internet 122 and, through menu-driven commands, enable or disable sections of the ladder logic just as he would be able to by flipping conventional dip switches at the installation site of the remote equipment. Additionally, the user will be able to configure the logic of the PLC remotely via the Internet as well.

A user may also control the functioning of a remote device in this way, via the Internet.

The user can enter commands at the website or other Internet interface, and those commands are forwarded to the server 1. In accordance with the user profile, for example, in the same way that exception messages are sent out via links 12a–d, a command message may be sent to the remote device through interface unit 10. Such command messages allow the user to activate, deactivate, and otherwise control the appliance. The interface unit 10 can receive these command messages D because the means by which the unit 10 communicates with the server, e.g., the cellular telephone network, is bi-directional. As a result of this bi-directionality, incoming links 11a–d may also be used to communicate with the devices through their respective interface units 10.

FIGS. 4 and 8–15 show the details of the message delivery server 1. In the preferred embodiment, server 1 includes four hardware devices (separated by heavy lines) 200, 300, 400, and 500. Device 200 is responsible for receiving incoming messages, processing them in accordance with the user's preferences, and routing them for output. Messages may be temporarily stored or accumulated on device 200 before being transmitted to the user if the user's message profile is set up accordingly. Device 300 enables the user 121 to access server 1 and create or edit his message profile residing in relational data base 21 of device 200. Device 400 includes the various drivers 33 which are responsible for transmitting the various messages to the various media (fax, e-mail, etc.). Device 500 includes billing computer 38 for keeping track of the charges and fees associated with the user's use of the service. It should be understood that the specific portions of each hardware device need not be arranged in the precise configuration shown.

At the core of server 1 is a relational data base 21. Incoming messages are received by a specific service designed to handle both the transport method and message formatting. Every interface unit 10 is provided, like a cellular telephone, with an electronic serial number (ESN, to identify the specific interface unit sending the message) and a mobile identification number (MIN, similar to a cellular telephone's phone number). In some instances, the exception or status information is embedded in the dialed digits the interface transmits. The dialed digits control channel module 25 specifically receives messages that are encoded in the control channel's dialed digits (see U.S. Pat. No. 5,594,740). The ESN control channel module 24 receives messages that are encode in the electronic serial number of the message (U.S. Pat. No. 5,546,444). It is preferable to have both a dialed digits module 25 and an ESN module 24, because some geographic regions employ dialed digit data coding, while other regions employ ESN data coding. Information may be transmitted via the MIN of the interface 10 and also received by message delivery server 1. Services are also available to receive messages for analog modems connected to the public telephone switched network 23, and the cellular digital packet data network 22. As additional methods of transmitting data become available, they can be added to the services layer.

All incoming messages are normalized at the normalization module 26 so that all incoming messages can then be processed without regard to their incoming medium. All incoming messages are passed to the normal message subroutine 27, exception messages are passed on for processing and routing via the user's configuration through the data base 21, and periodic status messages are queued. The missing message subroutine 28 compares received status messages with a list of expected messages. Status messages that are not received have an error message generated by the missing message subroutine 28 which are then delivered as configured by the user in his message profile as recorded in the relational database 21.

Messages to be delivered are placed in a message queue 32; as message traffic permits the appropriate drivers 33 request messages from the message queue 32 and route the messages over the appropriate transport. Numeric pages, faxes, voice and DTMF 34 are sent over the PTSN 12b–d, e-mail 35 is sent over the Internet 122. When a driver 33 has successfully delivered, a record is made in the data base 21 by the delivery confirmation subroutine 31 showing time and date of successful deliveries. Undeliverable messages are routed back to the database for generation of undeliverable message errors.

Users 121 connect to an Internet information server 30 via the Internet 122. The Internet information server presents to the user the information pertaining to that user's interfaces. Requests to alter the user's data are passed through active server pages 29 to protect both the integrity and security of the data base 21. All messages and transactions that pass through the system are logged in section 36, the transaction and message logs are then interfaced by section 37 to a billing system 38.

A portion of the memory in relational data base 21 is preferably used to compile data regarding the devices being monitored over time. Such data is sortable by any number of different criteria, including brand of equipment, specific models of equipment, installation date (and thus the age of the equipment), the general local climate in which the equipment is installed (e.g., arid, humid, warm, rainy, etc.), local weather conditions in a given period of time, and the like. This information is usable in a number of different ways. A user can log in via the Internet, for example, and find out the maintenance history of his specific units to see which are the most reliable or most unreliable. Alternatively, a user can check to see which brands or models generally are the most reliable for any given conditions (age, climate, weather, etc.). Additionally, the information may be collated and processed by the operator of data base 21 and published by any number of different criteria. Any of the various messages may be stored for this purpose, e.g., the incoming messages from the interface units, the normalized messages output from the normalization module, the outgoing messages, normal status messages, etc.

An example of the system's operation from the perspective of the user-contractor is as follows. When a user-contractor 121 first signs up with the system 50, he receives an account on the electronic message delivery server 1. Via the Internet, the contractor 121 is prompted through software to enter the pager numbers, cellular telephone numbers, facsimile machine numbers, and Internet addresses of any individuals who are to be contacted in the event of an exception condition in building equipment 2–5 for which the contractor is responsible. The user-contractor 121 may also set the software to notify him of the periodic successful routine status check messages conveyed from equipment 2–5.

Figure 5:
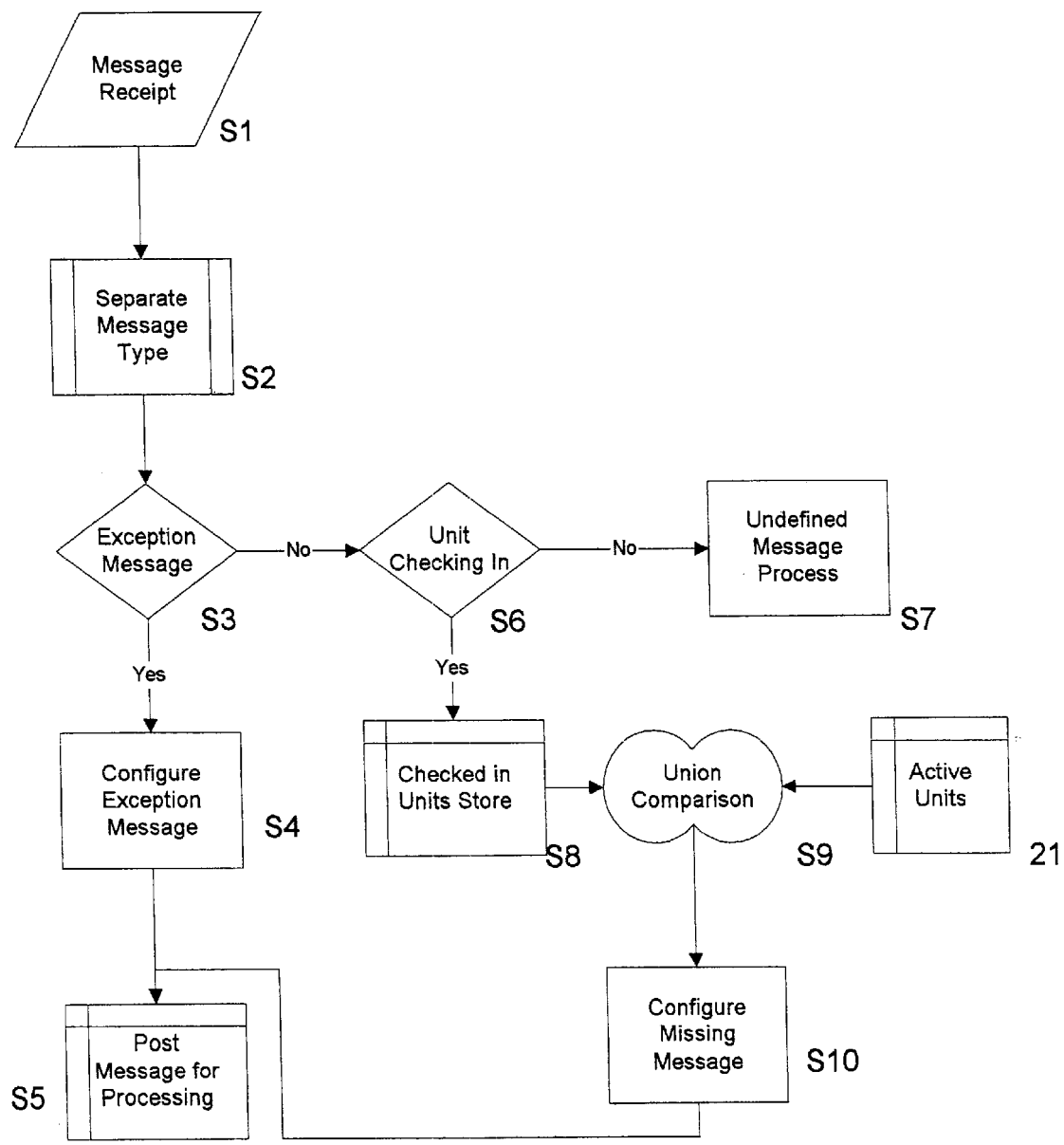
FIG. 5 is a flow chart depicting the operation of the system according to the invention.

FIG. 5 depicts a flow chart of the basic steps that occur when a message is received by server 1. At step S1, the message is received. At step S2, normalization module 26 removes the required elements from the incoming message and arranges them in a normalized format and stores them as a record in a table. Server 1 can now examine a specific element in a message of any received media type. At step S3, it is determined what type of error message has been received. If it is an exception message that requires immediate action, it is passed onto a process to begin configuration of a readable message at step S4 for delivery at step S5. If not, server 1 determines if the received message is a "unit checking in" or a "system ok" status message at step S6. If the user has his message profile so configured, a storing/accumulating step (not shown) may occur between steps S4 and S5. Undefined messages are handled at step S7. If it is configured as a periodic message received to indicate normal operation of a unit, the message is stored at step S8 for use at a later time. Periodically, the list of units that have reported in at step S8 and the list of active units expected to report in (part of database 21) are compared at step S9. Units on the active list that do not appear on the checked-in units list are processed, and units that failed to report in have messages created at step S10. These messages are then posted for further processing and message delivery at step S5.

In the example given, suppose boiler 3 breaks down in a non-catastrophic manner. The fault condition is detected by a sensor (not shown) and encoded to interface 10. Interface 10 transmits a radio message via link 13 to a local cell site 14, which contacts data circuits 17 via cellular network 16. Circuits 17 forward the message to message server 1. If the message is transmitted by the cellular telephone network 16, the ESN arrives via link 11b to ESN channel 24; alternatively, the dialed digits information arrives via link 11a to dialed digits channel 25.

The message is normalized in normalization module 26 and passed along to the normalized message process module 27. Module 27 selects the user's message profile from relational database 21 and in accordance therewith, determines what message gets sent to whom and by which medium. Alternatively or in addition, multiple fault conditions may be linked together via user-configurable ladder logic.

The above explanation was a "user's-eye" view of the macroscopic workings of the inventive system. Additional details concerning some of the inner workings of the preferred embodiment follow. In no way should these details be construed as being limiting of the scope of the invention.

Figure 4:
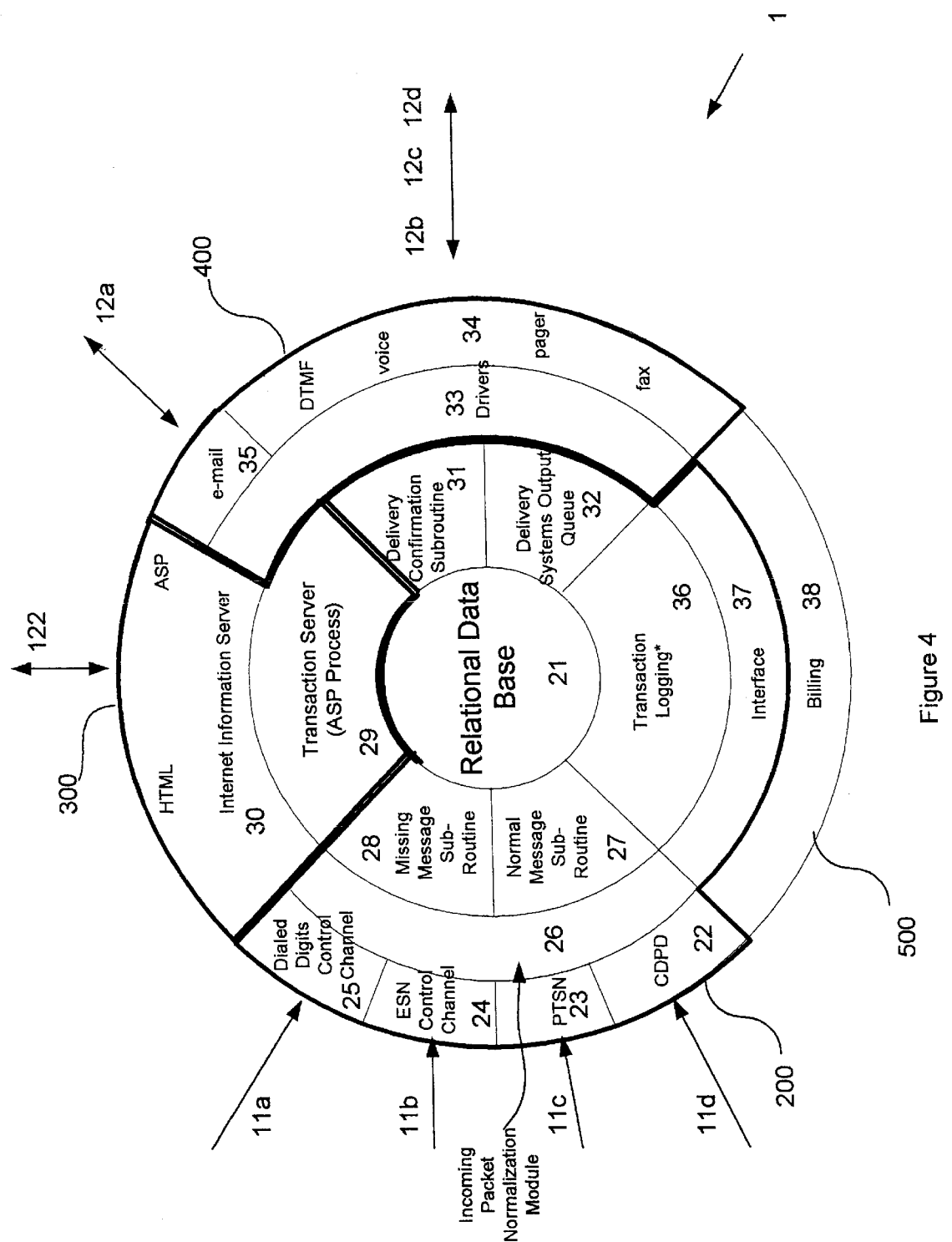
FIG. 4 is a schematic of a preferred embodiment of the electronic message delivery server according to the invention.
Figure 8:
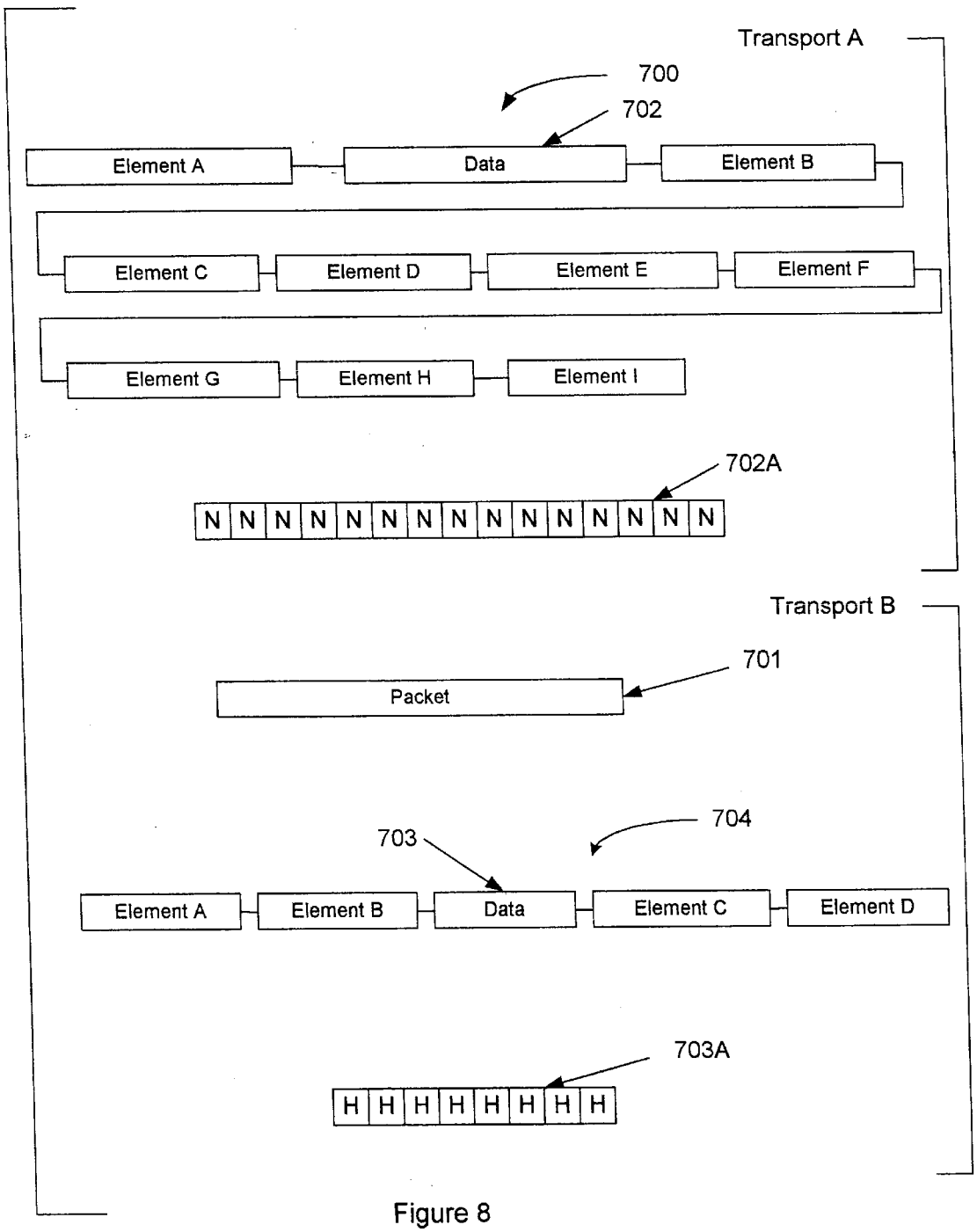
FIG. 8 is a schematic of two types of data transport utilized by the invention.

There are many available methods of transporting data; one of the objectives of the invention is thus to use various transport methods and have the received data normalized so the subsequent processes will not be effected by the transport method. FIG. 4 shows data being received in a variety of formats via links 11a–d by device 200. FIG. 8 illustrates two exemplary data transport formats receivable by device 200. A message received from the first transport, "Transport A," is received in the form of a string 700 of information packets having data packet 702. Data packet 702 is the message forwarded to the server by interface unit 10. This particular transport delivers the message in the form of fifteen decimal digits as shown by exemplary data packet 702A.

A different exemplary transport, "Transport B," is shown in FIG. 8 below Transport A. In Transport B, a single packet 701 is received. The single packet is parsed into elements which include a data element 703. An exemplary data element 703A is shown to include eight hexadecimal digits. One of the functions of the system is to be able to accept a wide variety of information formats not just limited to as described above, with Transport A delivering the data in the form of fifteen decimal digits and Transport B delivering the data in the form of eight hexadecimal digits.

On relational data base 21, a number of tables are provided, at least one for each transport, into which the received data is deposited. FIG. 9 shows the tables on data base 21 that are loaded with the data received from Transports A and B; Incoming Message Transport A Table 705 receives data elements 702 from Transport A, and Incoming Message Transport B Table 706 receives data elements 703 from Transport B. A standard data base command is used to insert the data into the next available row in the appropriate table when a data message is received from a transport. Incidentally, the central data base 21 may be provided with and use a conventional off-the-shelf data base processor such as SQL7 sold by Microsoft.

Figure 10:
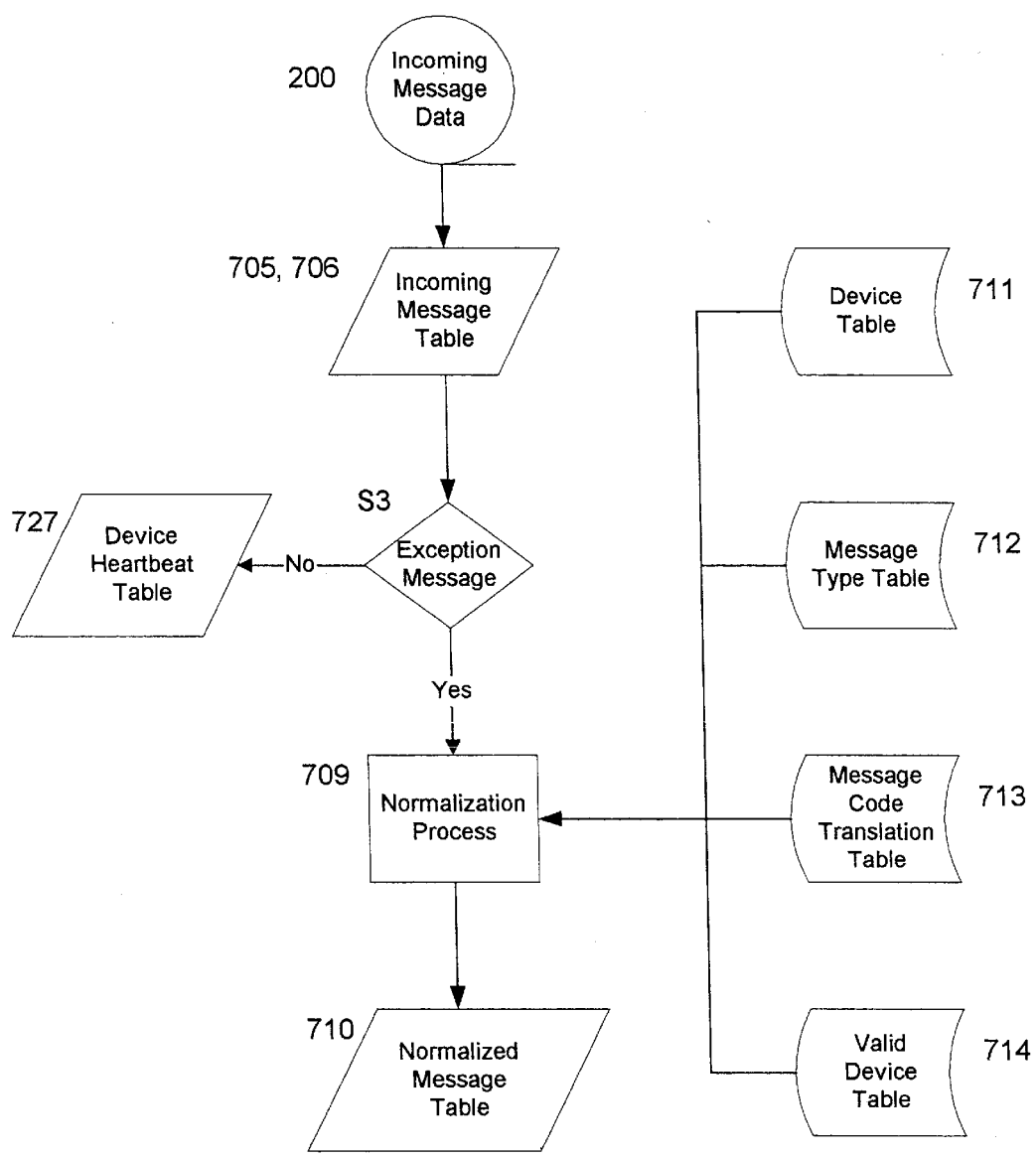
FIG. 10 is a logic chart illustrating the functioning of the normalization module of FIG. 4.

FIG. 10 shows the flow of data for a typical transport. All of the elements shown on FIG. 10 are required for each of the transports with the exception of the Normalized Message Table 710, which is the common table that all received exception messages are deposited into for further processing. The particular interface to a transport is represented generally as device 200, which includes the aforementioned control channels 22–25. Device 200 places the next incoming message from the transport into the corresponding Incoming Message Table 708 by utilizing the database's add row function. The Incoming Message Table 708 maintains the history of all messages received from a transport. When a row is added to the Incoming Message Table 708, the system determines at Step S3 (also see FIG. 5) whether the received message is an exception message or a normal status or "heartbeat" message. If the received message is normal status message, a row containing the received message data is added to the Device Heartbeat Table 727. A detail of the recorded heartbeat elements is shown on FIG. 14 as exemplary table 727A.

Figure 11:
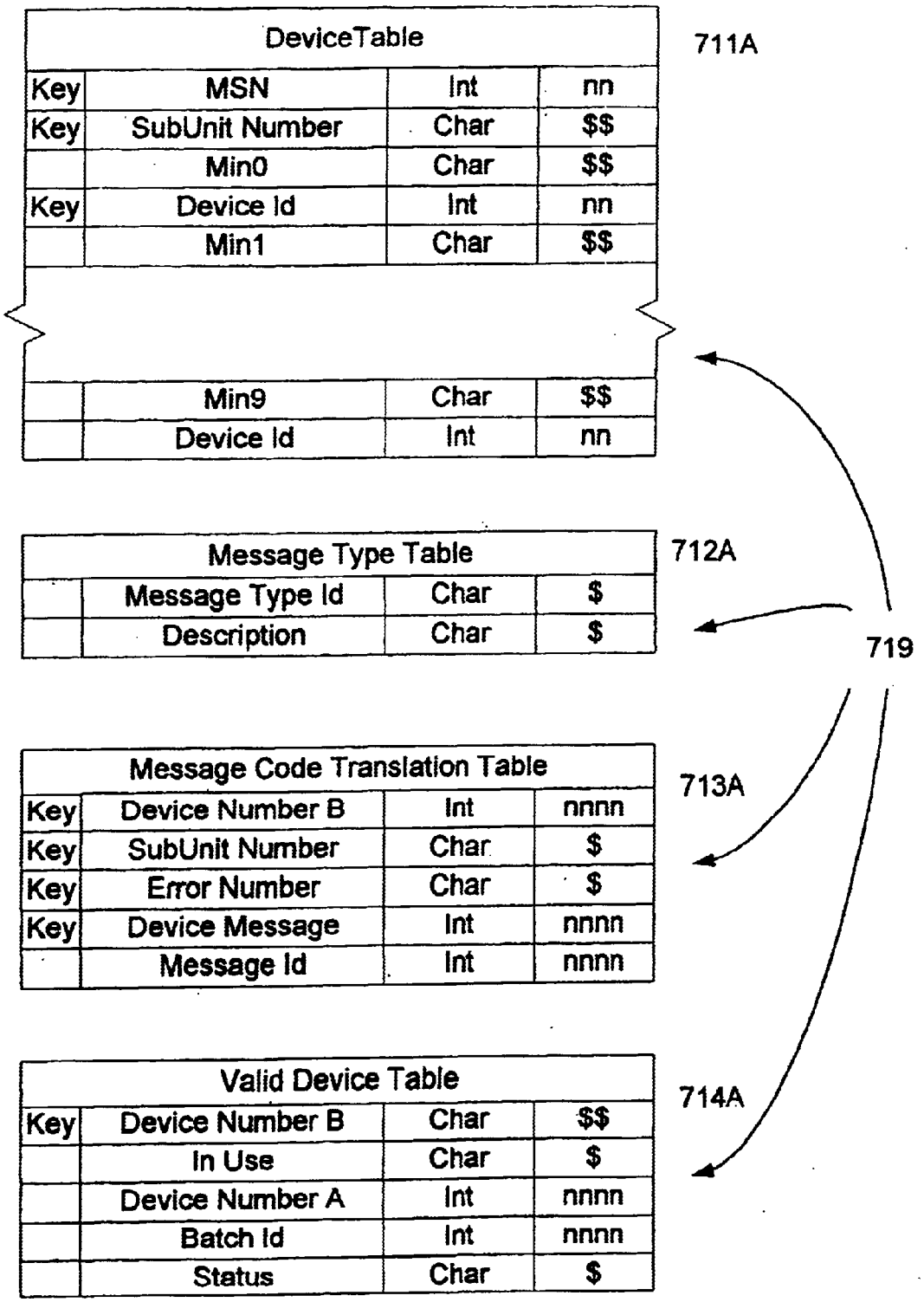
FIG. 11 is a schematic of the various data tables of FIG. 10.

If it is determined at Step S3 that the row added to the Incoming Message Table is an exception message, the Normalization Process 709 references a group of data tables 711–714 to validate the received message and translate the exception message from its original format that was best suited for the transport. Data tables 711–714 are provided on data base 21. Each transport requires its own set of data tables. For example, as shown in FIG. 11, tables 711A–714A correspond to Transport A; similar tables (not shown) would be provided for Transport B and any other transports utilized by the system. Device Table 711 is a list of devices manufactured for the transport, Valid Device Table 714 contains a list of devices that have been activated, Message Type Table 712 and Message Code Translation Table 713 are used to form the normalized message that is added to the Normalized Message Table 710. The Normalized Message Table 710 is a single table to which the respective Normalization Processes of all transports adds a row. The Normalization Process is the logical equivalent of normalization module 26 and normal message subroutine 27 of FIG. 4.

Figure 15:
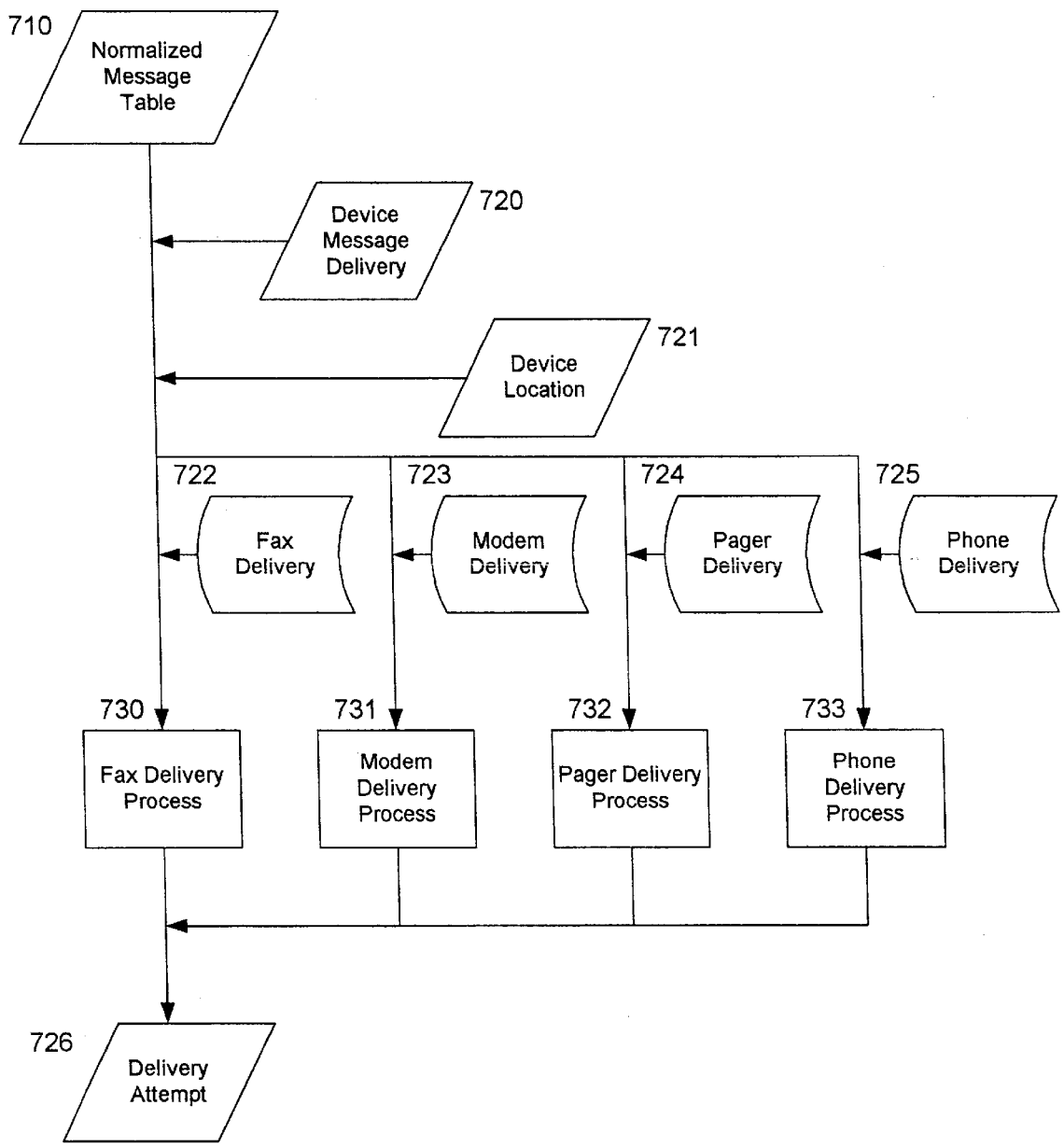
FIG. 15 is a logic chart illustrating the sending out of messages from the system in accordance with the invention.

FIG. 15 shows the flow of data after a message is deposited into the message queue 32 (see FIG. 4) pending delivery. The Normalized Message Table 710 functions as this queue. When an exception message is added as a row to this queue, a look-up operation is performed in the Device Message Delivery Table 720 (shown in detail in FIG. 12) for all message deliveries that pertain to the exception message pending delivery. Device Message Delivery Table 720 is a table of all delivery methods for all outgoing messages that potentially can be sent. Details of the Device Message Delivery Table 720A contains the information on, how many delivery attempts should be made for a particular message, by what method the delivery should be made, how many times this attempt should be made, how long to wait between attempts, and during what periods of time a message should be sent. Each delivery method i.e. Fax Delivery, Modem Delivery, Pager Delivery, Phone Delivery, etc. has a corresponding delivery process 730–733 and message table 722–725. For example, The Fax Delivery process 730 contains the required hardware and software to interface to the Public Switched Telephone Network (PSTN) and send a fax transmission to fax equipped receiver. The Fax Delivery table 722 contains the actual message to be sent to a fax receiver for each potential fax message. Each delivery process adds a row to the Delivery Attempt table 726 with the result of a delivery attempt. A successful or failed fax delivery is indicated in the table by the addition of a row by the result returned from, the fax hardware interface indicating the delivery result. The telephone delivery process utilizes a text to speech synthesizer to speak the message text to the person who answers the telephone call. Confirmation of deliver is established by the system requesting the person who is receiving the message to make certain actions such as press certain buttons on a touch tone telephone to acknowledge the receipt of the message. Acknowledgment or not is recorded by the Phone Delivery process 733 in the Delivery Attempt table 726.

It can be seen that the previously described user-defined message profile is not a discrete set of instructions that are all stored together, although it would appear so from the user interface, e.g., the website maintained by server 30. Rather, a user's message profile includes multiple elements, each of which is placed on a different table according to the type of data it represents. All of the users' respective delivery instructions are stored on Device Message Delivery Table 720. All of the users' respective facsimile delivery instructions are stored on Fax Delivery Table 722. All of the users' respective pager delivery instructions are stored on table 724. Each entry is identifiable by the "Key" associated therewith, as shown in the various tables of FIGS. 12–14.

The data engine (e.g., SQL 7) selects the next available row in the Normalized Message Table 710. Utilizing the Message Delivery ID, it then selects all records with the same Message Delivery ID in the Device Message Delivery Table 720. The resulting selection list is sorted by Delivery Method and those records that meet the selection criteria for message delivery time, and in service are prepared for message delivery. Each delivery process 730–733 polls the data engine to see if a message is available for delivery in the Device Message Delivery Table 720 with a delivery method that is suitable for its delivery function. If a delivery method is available to be sent the delivery process, for example a fax, the fax delivery process 730 will select the corresponding user defined message for the exception message to be sent from the Fax Delivery Table 722 along with the equipment location, make model, and serial number found in the Device Location Table 721. The delivery process then attempts to send the message to the user defined address found in the delivery table, for example, the fax number found in Fax Delivery table 722.

Each deliverable message is configurable by the user simply by editing the message text found in the delivery tables 722–725. Multiple deliveries are accomplished by having multiple delivery records in the delivery tables 722–725 with the same Message Delivery ID each having a unique delivery address i.e. fax number, phone number, etc. Additional delivery methods are easily added to the system by adding a new delivery transport process and an associated delivery table.

Figure 16:
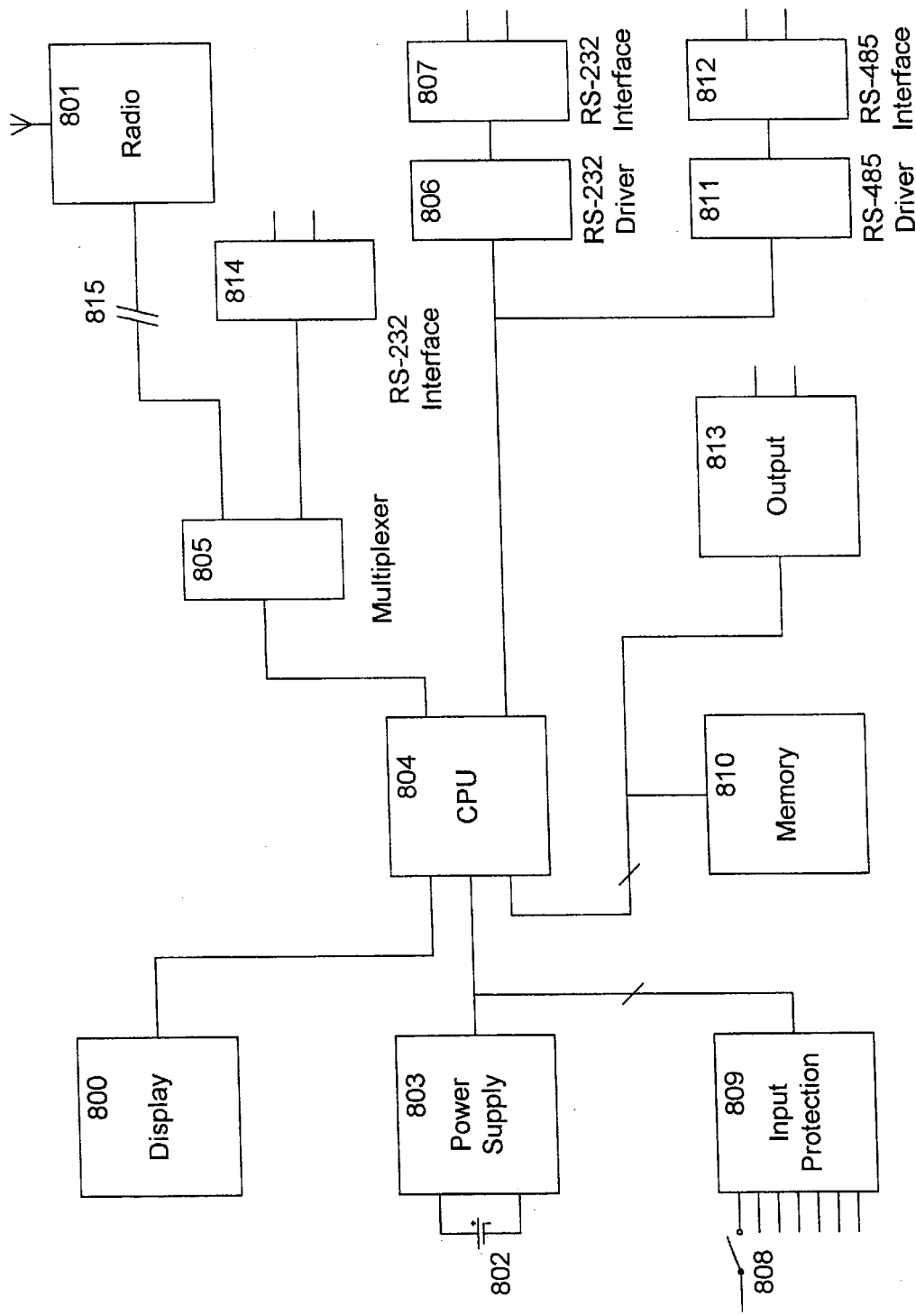
FIG. 16 is a schematic of the remote interface unit of FIG. 1.

FIG. 16 illustrates the remote interface unit (RIU) 10 used to send messages to the remote server. The RIU contains a removable module capable of sending messages to the server over a specific transport shown here as a two way radio 801. The RIU 10 can be connected to a monitored piece of equipment in several ways. An array of inputs 808 can be wired into the monitored piece of equipment's limit, operating and auxiliary sensors. Alternatively or in addition, the RIU 10 can be connected to the monitored equipment's communication interface if equipped by the equipment manufacture via a serial interface 807 or 812.

The central processing unit (CPU) 804 is preferably an industry standard 8-bit micro-controller with 3 general purpose input/output (IO) ports and 2 serial ports. The first IO port is connected to a display 800 that is used to indicate operating modes and conditions of the RIU 10 to a person installing, testing, or servicing the RIU. The second port is in communication with both the monitored equipment and the RIU's power supply. This port of the CPU is buffered and protected by filter 809 which uses standard filter arrangements from unwanted surges and voltage transients that may be present on the sensing devices 808 connected to the RIU. The port is also in communication with the RIU's internal power supply 803. CPU 804 is capable of operating the power supply 803 on and off in order to perform standby battery 802 tests, monitor the presence of line power, and use the frequency of the line power to maintain a time standard. The third IO port is used to connect additional memory 810 to the CPU 804 and to operate output drivers 813, which are typically in the form of relays. The state of the outputs can either be determined by results of decisions made within the CPU 804 or commands received from the remote server via the transport radio 801.

The CPU has two serial interface ports, the first port is connected to a multiplexer 805 that is used to steer the flow of serial data either to the transport radio module 801 or an internal interface 814 used to configure the RIR during manufacturing, testing, and subsequent configuration changes. The transport radio module 801 is connected to the multiplexer 805 via a connector 815; this enables different radio transports to be installed at the manufacture to enable the use of a particular transport best suited for an application. Factors that may effect the transport selection are quantity of data to be sent to the remote server, and wireless networks deployed i.e. control channel over AMP, or CDPD. The second serial interface is connected in parallel to both an RS-232 driver 806 and a RS-485 driver 811, with the respective driver being connected to an interface device, RS-232 807 and RS-485 812. Different equipment manufactures use different interface schemes on their equipment, some use RS-232 and some RS-485. For that reason, the RIU supports both. When one of these interfaces is used to communicate with a piece of equipment's communication port, all internal data maintained by the equipment's internal CPU may be available to the RIU for transmission to the remote sever. Sensing devices 808 may also be connected to the CPU 804 via the input protection circuit 809 when the RS-232 807 or RS-485 812 are used to communicate with the monitored equipment. Together, CPU 804, multiplexer 805, and radio 801 make up the message generating mechanism of interface unit 10 discussed above.

Once every 24 hours, the CPU assembles a packet (heartbeat) of data which contains status and operational data of connected monitored equipment and communicates this packet of data to the transport radio module 801. The transport radio module 801 then transmits the information to the remote server as a normal status message as explained above. The CPU 804 also monitors the status of the sensing devices 808. The state of these inputs is feed into a virtual Programmable Logic Controller (v-PLC) running within the CPU 804. The resultant relay outputs of the v-PLC can cause the CPU 804 to assemble an exception message packet and pass it on to the transport radio 801 for delivery to the remote server.

The invention is not limited to the above description but rather is defined by the claims appearing hereinbelow. Modifications to the above description that include that which is known in the art are well within the scope of the contemplated invention. For example, the invention is designed to be adaptable to all forms of electronic communication, be they cellular telephone, land line telephone, electronic mail, facsimile, text page, voice mail, etc. All forms of electronic media are contemplated as being within the scope of the invention. Also, multiple formats of incoming and outgoing messages are contemplated as included within the scope of the claims and the invention. The user can adjust the format and content of the messages he receives by setting up his message profile accordingly. The invention is also not limited to use in monitoring HVAC equipment but is contemplated to be useful for maintaining all forms of remote equipment. For example, the inventive system and method would prove extremely expedient is monitoring and replacing warning lights on cellular towers, radio transmitter towers, and other remote structures.

What is claimed is:

1. A method of monitoring and controlling remote equipment, comprising the steps of:
    a) determining a state of at least one parameter of at least one piece of the remote equipment;
    b) communicating a message indicative of the state from the piece of remote equipment to a computer server as an incoming message;
    c) enabling a user to remotely configure or modify a user-defined message profile containing outgoing message routing instructions, the user-defined message profile being storable on the computer server;
    d) enabling a user to remotely send command messages to the remote equipment via the computer server to remotely control the remote equipment;
    e) determining whether an incoming message is an incoming exception message indicative of improper operation of the piece of remote equipment;
    f) if it is determined in step e) that an incoming message is an incoming exception message, forwarding at least one outgoing exception message based on the incoming message to at least one user-defined communication device specifiable in the user-defined message profile, wherein the user can remotely configure or modify the user-defined message profile by remotely accessing the computer server.

2. A method according to claim 1, wherein step d) is performed remotely over the Internet.

3. A method according to claim 2, wherein the user may enter commands at a website.

4. A method according to claim 1, wherein the at least one remote communication devices specifiable by the message profile includes at least one of a facsimile machine, an e-mail receiving device, a cellular telephone, a beeper, a pager, a PCS device, and a telephone.

5. A method of monitoring and controlling remote equipment, comprising the steps of:
    a) enabling bidirectional communication between at least one piece of remote equipment and a user;
    b) communicating a message indicative of a state of the remote equipment from the remote equipment to a computer server as an incoming message;

c) enabling a user to remotely configure or modify a user-defined message profile containing outgoing message routing instructions, the user-defined message profile being storable on the computer server;

d) enabling a user to remotely send command messages to the remote equipment via the computer server to remotely control the remote equipment; and e) forwarding at least one outgoing message based on the incoming message to at least one user-defined communication device specifiable in the user-defined message profile, wherein the user can remotely configure or modify the user-defined message profile by remotely accessing the computer server.

6. A method according to claim 5, wherein the at least one remote communication devices specifiable by the message profile includes at least one of a facsimile machine, an e-mail receiving device, a cellular telephone, a beeper, a pager, a PCS device, and a telephone.

7. A method of monitoring and controlling remote equipment, comprising the steps of:

a) enabling bi-directional communication between at least one piece of remote equipment and a user;

b) communicating a message indicative of a state of the remote equipment from the remote equipment to a computer server as an incoming message;

c) enabling a user to remotely configure or modify a user-defined message profile containing outgoing message routing instructions, the user-defined message profile being storable on the computer server; and d) enabling a user to remotely send command messages to the remote equipment via the computer server to remotely control the remote equipment.

8. A system for monitoring and controlling remote equipment, comprising:

a sensor in local communication with a piece of remote equipment, said sensor detecting a state of at least one parameter of the piece of remote equipment;

an interface unit, locally connected to said sensor and in communication with the piece of remote equipment, said interface unit having a message generating means for generating an incoming message corresponding to the detected state of the remote equipment; and a computer server in remote bi-directional communication with said interface unit, said server adapted to receive said incoming messages generated by said interface unit, said computer server having a user interface, a user being capable of remotely accessing said computer server via said user interface i) to remotely configure a user-defined message profile containing outgoing message routing instructions and ii) to remotely control the remote equipment via said user interface by sending command messages to said server, wherein when said message generating means generates an incoming message, said interface unit forwards said incoming message to said server, and wherein said server forwards at least one outgoing message to at least one predetermined user-defined remote communication device based on said incoming message as specified in said user-defined message profile.

9. A system according to claim 8, wherein said message generating mechanism of the interface unit forwards said incoming messages to said computer server via at least one of a plurality of communication media, said media comprising at least one of a cellular telephone network, radio transmissions, telephone lines, and the Internet.

10. A system according to claim 9, wherein said interface unit is adapted to receive command messages directly from said user.

11. A system according to claim 8, wherein when a user sends a command message, said message generating means generates an incoming message in response thereto.

12. A system according to claim 9, wherein when a user sends a command message, said message generating means generates an incoming message in response thereto.

13. A system according to claim 8, wherein said remote communication devices include at least one of a facsimile machine, an e-mail receiving device, a cellular telephone, a beeper, a pager, a PCS device, and a land line telephone.

14. A system according to claim 10, wherein said interface unit periodically generates a normal status message if said sensor to which said interface unit is connected detects a normal status condition indicative of proper operation of said respective piece of equipment to which said sensor is connected, said normal status message including an equipment identification code of said respective piece of equipment.

15. A system for monitoring and controlling remote equipment, comprising:

an interface unit in bi-directional communication with a piece of remote equipment and with at least one communication link, said interface unit having a message generating means for generating an incoming message corresponding to a state of the remote equipment; and a computer server in remote bi-directional communication with said interface unit, said server adapted to receive said incoming messages generated by said interface unit, said computer server having a user interface, a user being capable of remotely accessing said computer server via said user interface to remotely configure a user-defined message profile containing outgoing message routing instructions, wherein a user may send a command message to the remote piece of equipment via said communication link and said interface unit to thereby control the remote piece of equipment remotely, and wherein when said message generating means generates an incoming message, said interface unit forwards said incoming message to said server, and wherein said server forwards at least one outgoing message to at least one predetermined user-defined remote communication device based on said incoming message as specified in said user-defined message profile.

16. A system according to claim 15, wherein said computer server is adapted to receive command messages from the user and forward said command messages to the remote piece of equipment.

17. A system according to claim 15, wherein when a user sends a command message, said message generating means generates an incoming message in response thereto.

18. A system according to claim 16, wherein when a user sends a command message, said message generating means generates an incoming message in response thereto.

19. A system for monitoring and controlling remote equipment, comprising:

an interface unit in bi-directional communication with a piece of remote equipment and with at least one communication link, said interface unit having a message generating means for generating an incoming message corresponding to a state of the remote equipment; and a computer server in remote bi-directional communication with said interface unit, said server adapted to receive said incoming messages generated by said interface unit, said computer server having a user interface, a user being capable of remotely accessing said computer server via said user interface to remotely configure a user-defined message profile containing outgoing message routing instructions, wherein a user may send a command message to the remote piece of equipment via said wireless communication link and said interface unit to thereby control the remote piece of equipment remotely, and wherein when said message generating means generates an incoming message, said interface unit forwards said incoming message to said server.

20. A system for monitoring and controlling remote equipment, comprising:

an interface unit in bi-directional communication with a piece of remote equipment, said interface unit having a message generating means for generating an incoming message corresponding to a state of the remote equipment; and a computer server in remote bi-directional communication with said interface unit, said server adapted to receive said incoming messages generated by said interface unit, said computer server having a user interface, a user being capable of remotely accessing said computer server via said user interface i) to remotely configure a user-defined message profile containing outgoing message routing instructions and ii) to remotely control the remote equipment via said user interface by sending command messages to said server, wherein when said message generating means generates an incoming message, said interface unit forwards said incoming message to said server, and wherein said server forwards at least one outgoing message to at least one predetermined user-defined remote communication device based on said incoming message as specified in said user-defined message profile.

21. A system for monitoring and controlling remote equipment, comprising:

an interface unit in bi-directional communication with a piece of remote equipment, said interface unit having a message generating means for generating an incoming message corresponding to a state of the remote equipment; and a computer server in remote bi-directional communication with said interface unit, said server adapted to receive said incoming messages generated by said interface unit, said computer server having a user interface, a user being capable of remotely accessing said computer server via said user interface i) to remotely configure a user-defined message profile containing outgoing message routing instructions and ii) to remotely control the remote equipment via said user interface by sending command messages to said server, wherein when said message generating means generates an incoming message, said interface unit forwards said incoming message to said server.

* * * * *